(12) United States Patent
Satkunanathan et al.

(10) Patent No.: US 7,676,437 B2
(45) Date of Patent: *Mar. 9, 2010

(54) REAL-TIME LICENSE ENFORCEMENT SYSTEM AND METHOD

(75) Inventors: Lingan Satkunanathan, Kirkland, WA (US); Sameer Yusufali Merchant, Bellevue, WA (US); Gary P. Raden, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/188,401

(22) Filed: Jul. 25, 2005

(65) Prior Publication Data

US 2005/0256805 A1    Nov. 17, 2005

Related U.S. Application Data

(63) Continuation of application No. 10/723,324, filed on Nov. 26, 2003.

(51) Int. Cl.
*G06F 1/00*    (2006.01)

(52) U.S. Cl. .............................. 705/56; 705/57; 705/67; 713/190

(58) Field of Classification Search ................... 705/34, 705/59; 703/27; 700/82; 717/167
See application file for complete search history.

(56) References Cited

U.S. PATENT DOCUMENTS

| | | | |
|---|---|---|---|
| 5,204,897 A | 4/1993 | Wyman | |
| 5,579,222 A * | 11/1996 | Bains et al. | 717/167 |
| 5,654,375 A | 8/1997 | Jiang | |
| 5,671,412 A | 9/1997 | Christiano | |
| 5,754,763 A | 5/1998 | Bereiter | |
| 5,758,068 A | 5/1998 | Brandt et al. | |
| 5,790,664 A * | 8/1998 | Coley et al. | 709/203 |
| 5,859,637 A | 1/1999 | Tidwell | |
| 5,966,532 A | 10/1999 | McDonald et al. | |
| 6,021,438 A | 2/2000 | Duvvoori et al. | |
| 6,029,145 A * | 2/2000 | Barritz et al. | 705/34 |
| 6,049,789 A | 4/2000 | Frison et al. | |
| 6,053,951 A | 4/2000 | McDonald et al. | |
| 6,056,786 A | 5/2000 | Rivera et al. | |

(Continued)

OTHER PUBLICATIONS

Antonio Mana, et al. An Efficient Software Protection Scheme. University of Malaga, 1997. pp. 1-16, Malaga, Spain.

(Continued)

*Primary Examiner*—Evens J Augustin
(74) *Attorney, Agent, or Firm*—Workman Nydegger

(57) ABSTRACT

A license enforcement system is disclosed herein. The system receives digitized licenses associated with computer applications in a secure license store. The licenses are then monitored and compared with the actual use by users to determine compliance with licenses. If users employ an application in violation of licensing terms then corrective action can be taken such as providing warnings and/or shutting down or denying access to a licensed application. Additional security features are employed to ensure that license store data is valid and that the system is constantly monitored except where a bypass component is properly utilized. Furthermore, a user can utilize a plurality of different wizards such as an add license wizard, a backup license wizard and a restore license wizard, to facilitate easy step-by-step interaction with the license system.

20 Claims, 32 Drawing Sheets

U.S. PATENT DOCUMENTS

| | | | |
|---|---|---|---|
| 6,219,652 | B1 | 4/2001 | Carter et al. |
| 6,233,726 | B1 | 5/2001 | Bowman et al. |
| 6,295,531 | B1 | 9/2001 | Bae et al. |
| 6,381,640 | B1 | 4/2002 | Beck et al. |
| 6,385,727 | B1 * | 5/2002 | Cassagnol et al. ........... 713/193 |
| 6,438,666 | B2 * | 8/2002 | Cassagnol et al. ........... 711/163 |
| 6,502,234 | B1 | 12/2002 | Gauthier et al. |
| 6,510,466 | B1 | 1/2003 | Cox et al. |
| 6,564,375 | B1 | 5/2003 | Jiang |
| 6,574,612 | B1 | 6/2003 | Baratti et al. |
| 6,591,150 | B1 * | 7/2003 | Shirota ........................ 700/82 |
| 6,615,166 | B1 * | 9/2003 | Guheen et al. ................ 703/27 |
| 6,785,825 | B2 | 8/2004 | Colvin |
| 6,799,277 | B2 * | 9/2004 | Colvin ........................ 726/22 |
| 6,810,389 | B1 | 10/2004 | Meyer |
| 6,834,259 | B1 | 12/2004 | Markwitz et al. |
| 6,857,067 | B2 * | 2/2005 | Edelman .................... 713/155 |
| 7,054,892 | B1 * | 5/2006 | Phillips et al. .............. 707/204 |
| 2001/0011253 | A1 * | 8/2001 | Coley et al. .................. 705/59 |
| 2002/0069420 | A1 * | 6/2002 | Russell et al. ................. 725/92 |
| 2002/0138441 | A1 * | 9/2002 | Lopatic ....................... 705/59 |
| 2003/0065642 | A1 * | 4/2003 | Zee ............................... 707/1 |
| 2004/0054893 | A1 * | 3/2004 | Ellis ........................... 713/165 |
| 2004/0153416 | A1 * | 8/2004 | Fujimoto ..................... 705/59 |

OTHER PUBLICATIONS

F.V. Brasileiro, et al. Bouncer: A Robust and Flexible License Management Service for Avoiding Illegal Use of Software. Universidade Federal da Paraiba, 2001. Campina Grande, Paraiba.

Office Action dated Apr. 26, 2005 cited in U.S. Appl. No. 10/723,324.

Office Action dated Aug. 30, 2005 cited in U.S. Appl. No. 10/723,324.

Office Action dated Aug. 23, 2007 cited in U.S. Appl. No. 10/723,324.

Office Action dated Feb. 27, 2008 cited in U.S. Appl. No. 10/723,324.

Office Action dated Jul. 29, 2008 cited in U.S. Appl. No. 10/723,324.

Office Action dated Feb. 24, 2009 cited in U.S. Appl. No. 10/723,324.

* cited by examiner

Fig. 16

REAL-TIME LICENSE ENFORCEMENT SYSTEM AND METHOD

CROSS-REFERENCE TO RELATED APPLICATIONS

This application is a continuation of U.S. patent application Ser. No. 10/723,324, filed on Nov. 26, 2003, and entitled "REAL-TIME LICENSE ENFORCEMENT SYSTEM AND METHOD," the entirety of which is incorporated herein by reference.

TECHNICAL FIELD

The present invention relates generally to property rights enforcement and more particularly toward a system and method for monitoring and enforcing licenses in real-time.

BACKGROUND

Computer software is a unique product that requires specialized protection. The production of valuable software these days is most likely the result of years of research and development by a number of highly skilled individuals. To maintain such research requires a large investment. Computer software is a unique product in that production and distribution costs are de minimus in comparison to the initial costs of research and development. Moreover, unlike most other products, software can be easily and inexpensively reproduced without a loss in quality between an original and a copy. Accordingly, software must be protected differently then other business and commercial products such as through copyright and patent protection. After protecting their software using the appropriate intellectual property law mechanisms, software companies can then require users to purchase licenses to use software rather than selling all rights to consumers outright.

Software product licenses are agreements between software companies (licensor) and end users (licensees) granting users the right to use, run, or access software in accordance with the terms of a license agreement sometimes referred to as end-user licensing agreement (EULA). Licensing agreements or EULAs can be structured in almost any manner desired by software producers. For example, licenses can be perpetual or time-based. Furthermore, license agreements can be structured in a variety of different manners depending on the type of software product (e.g., application, system software, server software) to be licensed.

Software piracy refers to the unauthorized use of software. Piracy costs software companies billions of dollars worldwide and reduces the amount of money available for research and development. As a result, software innovation is stifled and thousands of skilled people are left without jobs. Software companies are not the only entities that are negatively impacted by software piracy. Users of pirated software risk carrying and transmitting viruses as product patches and upgrades are not freely available to pirated software versions. Use of pirated software also drastically increases IT support costs in organizations due not only to viruses but also because of version control problems that prevents efficient sharing among users. Software can be "pirated" by making unauthorized copies of a program, under reporting the number of computers using software, or otherwise failing to abide by a licensing agreement. For example, a user may purchase a single copy of software and install it on more than one computer or allow others (e.g. friends, family, coworkers) to install the program in violation of a licensing agreement. Alternatively, a user may simply copy a software program (e.g., burning a duplicate CD) or download the software program without paying the respective software company for a license.

Conventionally, licensing systems employ one of several largely unsuccessful techniques to prevent piracy and capture the appropriated revenue under license agreements. Some software companies distribute software via disks (e.g., compact disk or floppy disk) with a licensing key or product ID that needs to be entered during installation to activate the software and thereby complete installation of the software. This system simply ensures that users have both the software disks and the product ID and therefore provides very little protection against piracy. Additionally, some software companies have attempted to copy protect their software so that a purchaser cannot make copies and give them to others such as co-workers, friends, and family. However, this does not protect against simply loaning those people the original software with the product ID. Moreover, efforts to copy protect software have been for the most part unsuccessful as most copy protection efforts have been easily circumvented by knowledgeable programmers. Furthermore, volume licensing is conventionally accomplished by purchasing an appropriate license for the number of users that will be utilizing the software. If later more users are added, the licensor software company relies on the honesty of the purchasing licensee to contact the software company and purchase extra licenses for the additional users in excess of what is provided for by the current licenses. Therefore, there is currently no viable enforcement system that ensures that licensees abide by their license agreements. Accordingly, there is a need in the art for a novel license enforcement system which is secure and easy to use.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Disclosed herein is a license enforcement system and method. The system comprises a monitoring component for monitoring use of licensed software applications and detecting variations from their respective licensing agreements in real-time. The system also comprises an enforcement component for initiating corrective actions to force users to comply with licensing agreements or deny the user access to the licensed software. The license enforcement system and method also include various other safeguards such as a validation component and an oversight component to ensure the validity and integrity of stored license data and to make sure the system is not improperly deactivated.

The subject invention also utilizes a novel system and method for adding licenses to computer systems. In particular, digital licenses are employed rather than conventional paper licenses. In accordance with an aspect of the present invention, one or more licenses can be installed onto a computer system via a license component. The licensing component requires activation wherein the component is tied to the hardware that the licensing component is initially installed upon. After a component is activated, installation of the component can be completed which among other things involves storing one or more licenses in a secure license store. Additional systems and methods are also disclosed for managing digital licenses such as storing backup copies of the licenses and restoring them in the event they are tampered with by unscrupulous individuals or otherwise corrupted.

Still further yet, interactive wizards are disclosed herein to facilitate user interaction with the license system of the present invention. More specifically, wizards are disclosed for adding licenses, backing up licenses, and restoring licenses.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

FIG. 16 illustrates an exemplary GUI associated with adding a license in accordance with an aspect of the subject invention.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein the term application or software application refers generally to any type of program comprising computer executable code including but not limited to system software such as operating systems, server software or processes, as well as user applications such as word processors, spreadsheets, web browsers, and the like.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject invention.

Figure 1:
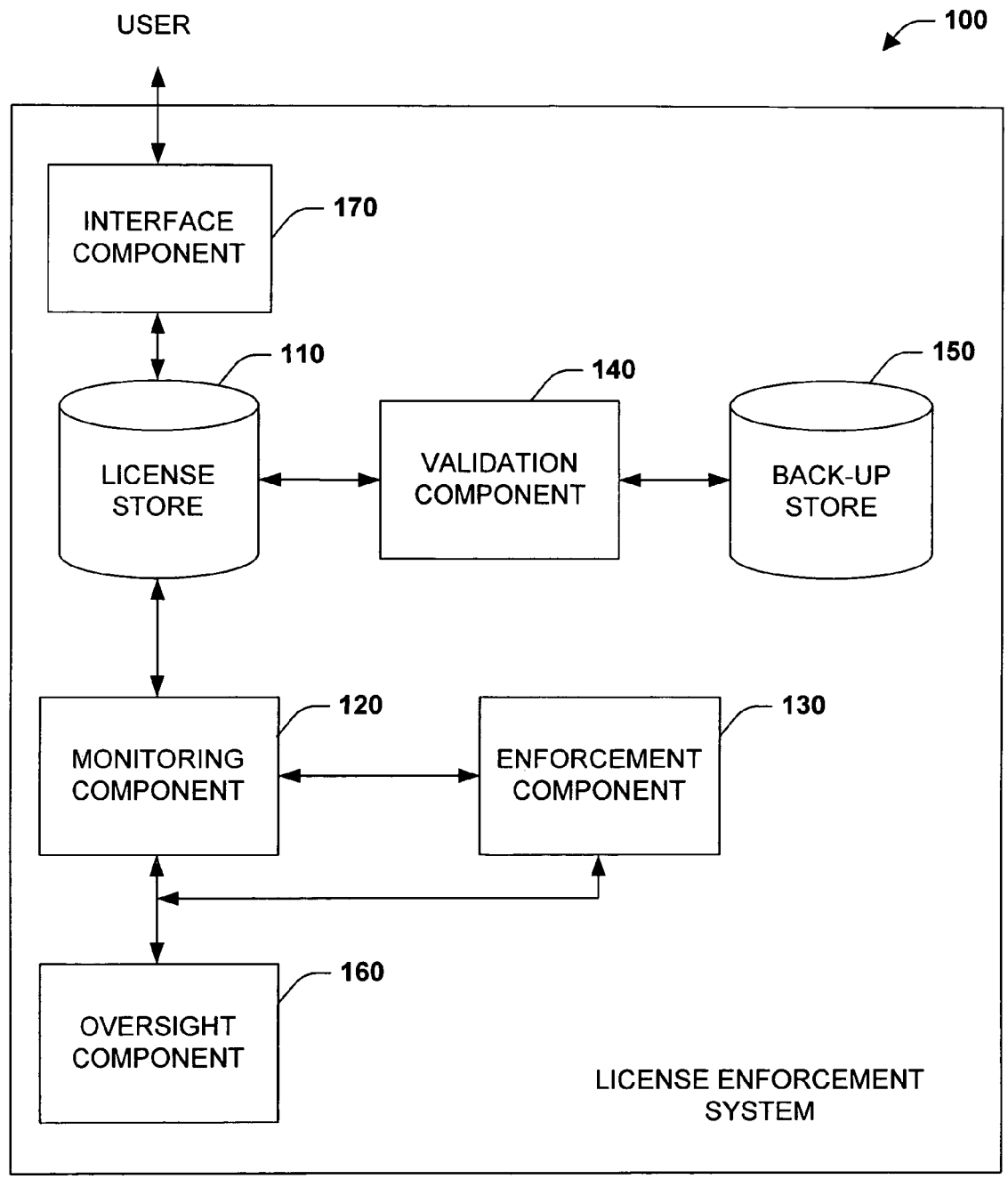
FIG. 1 is a block diagram of a license enforcement system in accordance with an aspect of the present invention.

Turning initially to FIG. 1, a license enforcement system 100 is illustrated in accordance with an aspect of the subject invention. License enforcement system comprises a license store 110, a monitoring component 120, an enforcement component 130, a validation component 140, a backup store 150, an oversight component 160, and an interface component 170. License store 110 is a storage repository for licenses and associated data such as the number of licenses and the type (e.g., perpetual or time based, per device, per user . . . ). License store 110 can be located on a storage device including but not limited to magnetic and optical devices (e.g. hard drive, compact disk). Accordingly, license store 110 can act as a central storage location for licensing enforcement system 100. Monitoring component 120 utilizes license data from license store 110 to determine compliance with end user licensing agreements (EULAs) in real-time. Monitoring component 120 monitors and manages the number of valid licenses stored in license store 110 and the number of licenses used. Monitoring component 120 can then notify enforcement system 130 if there is any discrepancy. Monitoring component 120 can support a plurality of licensing schemes including be not limited to user-based licensing and device-based licensing. A user-licensing scheme requires a license for every user accessing or using licensed systems or applications, whereas a device-licensing scheme requires a license for each device (e.g., computer) that accesses a licensed application. For example, if a server application was installed with five valid licenses for distribution in accordance with a user-licensing scheme and after all licenses had been distributed a sixth user attempted to log on, the monitoring component 120 could notify the enforcement component of the attempt of a sixth user to logon with only five valid or authorized licenses. If a similar application is installed on five devices in accordance with a device licensing scheme, then the sixth user would be authorized as long as they logged on to one of the five licensed devices.

Enforcement component 130 ensures compliance with licensing agreements by taking a variety of corrective actions such as notification of violations and shutting down all or part of an application associated with the license. For example, the enforcement component 130 could issue warnings at periodic intervals to a user or network administrator. Additionally or alternatively, enforcement component could shut down particular applications or systems that are being utilized in violation of a licensing agreement. For instance, in the above example the enforcement component could allow the sixth user to access the system, but provide a warning and/or periodic notifications of the violation of the user licensing agreement using a message like "Warning: Use of this application is in violation of the licensing agreement. Please purchase an additional license." The warnings could increase in frequency as time passed and the application or system continued to be operated in violation of the licensing agreement. Finally, after a certain amount of time the enforcement component could notify the user of the violation and deny access to the particular application or system.

Validation component 140 can provide periodic (e.g., daily, after restoring licenses from back-up . . . ) validity checks on the license store 110 to ensure that data has not been tampered with by malicious individuals or otherwise corrupted. The validations can be accomplished by retrieving a license key and hardware ID from a backup store 150. Backup store 150 can include any of a multitude of storage mediums including but not limited to a magnetic storage devices (e.g., computer hard drive, floppy disk), optical storage devices (e.g., CD-RW disk), and flash memory devices (e.g., memory stick, memory card). Retrieved license keys and hardware ID values can then be compared with the values in the license store. However, it should be noted that when checking the hardware ID against previously stored value, a tolerance should be allotted to account for minor changes in the hardware resulting from system upgrades, for instance. Alternative means can also be employed to validate data in the data store including by not limited to correctly decrypting encrypted data, employing a checksum, and the like. If data in the store is determined invalid, the validation component 140 can subsequently attempt to delete the store. If the store cannot be deleted, then the validation component 140 can initiate a shutdown process for the computer system. If the store can be deleted then the validation component can then check the validity of the backup, in backup store 150, if available. If the backup can be validated then the system can be restored from the backup. Otherwise, the validation component can cause an error message to be displayed such as "The license store was detected to be invalid and could not be restored" and initiate shutdown of the computer system. License enforcement system 100 can also include an oversight component 160.

Oversight component 160 monitors or oversees the functioning of monitoring component 120 and also enforcement component 130. Monitoring component 120 is a critical component for the enforcement system of the present invention as it actually determines when a violation of a licensing agreement occurs. As such, monitoring component 120 should always be running to detect violations of a licensing agreement (except if a valid bypass component is in place). Oversight component 160 provides such functionality by continuously observing monitoring component 120 and ensuring it is operating properly. If oversight component 160 determines that monitoring component 120 is not operating or is operating improperly it can attempt to restart monitoring component 120. If the oversight component 160 cannot restart the monitoring component 120 then an error message can be displayed to indicate the state of the monitoring component 120 and a shutdown process can be commenced. Oversight component 160 can also over see operation of the enforcement component 130 in a similar manner to ensure that it is operating properly and has not been improperly deactivated.

Furthermore, interface component 170 can provide a mechanism for a user to interact with the license enforcement system in many different ways. For example, interface component 170 can be employed to enable a user to query the license store and view information regarding licenses including but not limited to the number, type, and period of expiration (if applicable). Additionally, other information such as license activation history, particular license agreements, information on purchasing additional licenses, backing up licenses, transferring licenses, and restoring licenses can be accessible through interface component 170. Further yet, interface component 170 can provide information to a graphical user interface, which can be designed so as to allow a user quick and easy access and interaction with license system information. Finally, interface component 170 can be utilized by other license systems components, such as enforcement component 130 to provide warnings or notifications in the event a licensing agreement is violated.

Figure 2:
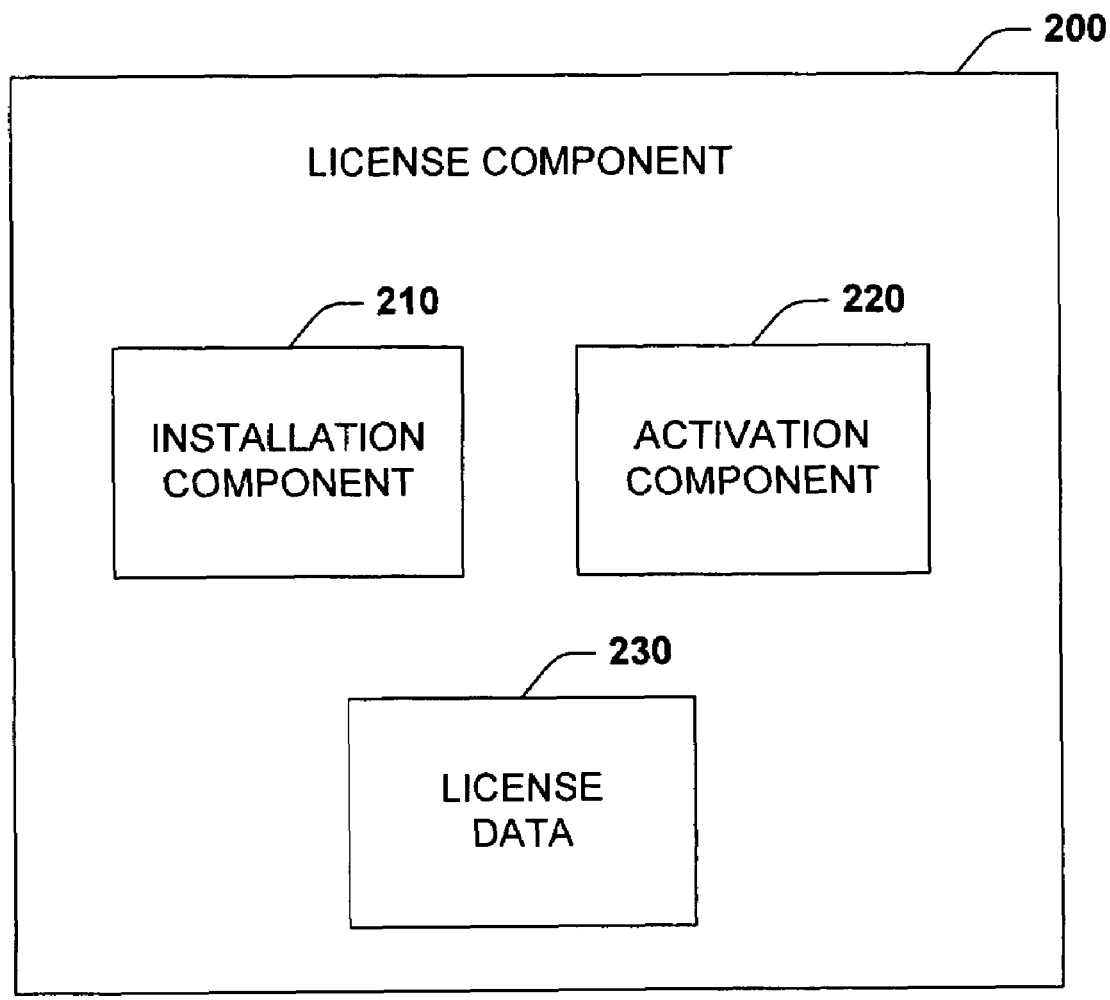
FIG. 2 is a schematic block diagram of a license component in accordance with an aspect of the present invention.

FIG. 2 depicts a block diagram of a license component 200 in accordance with an aspect of the present invention. License component 200 is computer program product that, inter alia, installs digitized licenses to a license store 110. Accordingly, license component 200 can be stored on a computer readable medium or transferred electronically as a group or package of components to facilitate adding licenses to a system. License component 200, as shown, includes installation component 210, activation component 220, and license data 230. Installation component 210 provides the mechanism for storing license data 230 to license store 110 (FIG. 1). Activation component 220 provides a mechanism for activating license component 200. According to one aspect of the present invention, licenses activation is required before license data 230 can installed or saved to license store 110 so as to provide licenses to license enforcement system 100. Requiring license component activation provides increased security and mitigation of piracy by allowing the license component to be installed only a certain number of times (e.g., once, twice, ten times . . . ) as determined by a distributing entity. An activation system and process will be described in further detail in later sections. Furthermore, it should be noted that while activation component 220 is illustrated separate from installation component 210 the present invention contemplates the combination of the two components. License data 230 is protected information (e.g., encrypted) that is stored in license store 110 concerning the number of licenses, the type of license, and other license restrictions.

Figure 3:
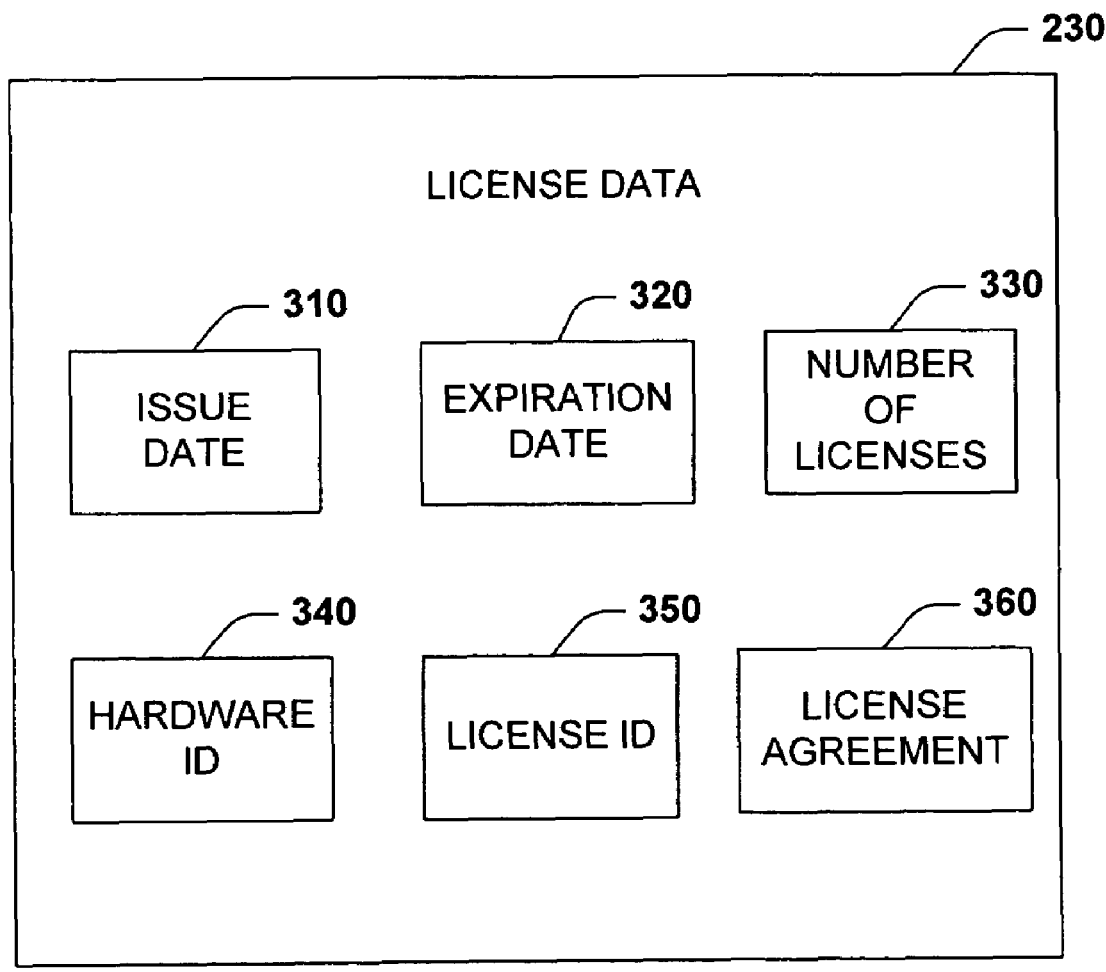
FIG. 3 is a block diagram illustrating licensing data in accordance with an aspect of the subject invention.

Turing briefly to FIG. 3, a block diagram is shown illustrating exemplary licensing data 230 in accordance with an aspect of the subject invention. License data 230 includes issue date 310, expiration date 320, number of licenses 330, hardware identification (hardware ID) 340, license identification (license ID) (also referred to as license code) 350, and license agreement 360. Issue date 310 corresponds to the date on which the license component was successfully installed to a license store. This data can be set upon license component installation. Expiration date 320 is data that relates to time-based rather than perpetual licenses. A license entity often allows perpetual licenses or licenses that, with some exceptions, are good for life. However, a licensing entity can provide for time-based licenses, also known as rental licenses, which only allow a user licensed access for a specified period of time. Such licenses are beneficial for users as they allow a user to pay for only what they will use rather then for a much more expensive perpetual license. Expiration date 320 indicates when a time-based license expires. Number of licenses 330 specifies the number of licenses the particular license component is authorizing. Accordingly, license components can be designed to efficiently supply a plurality of digital licenses (e.g., 1, 5, 10, 25, 75) in accordance with demand. Hardware ID 340 is a numeric or alphanumeric identifier that specifically identifies the system on which the license component is initially installed or stored. The hardware ID 340 acts as one mechanism to prevent a purchaser of a license from installing the component on multiple systems while only paying for installation on a single system. Hardware ID 340 can be generated during activation (described in detail infra) and thereafter saved as license data. License ID 350 is a code (e.g., numeric, alphanumeric . . . ) that uniquely identifies a license component. Such unique identification is important for identifying different types of licenses and ensuring the license is used in accordance with the licensing agreement 360. Licensing agreement 360 provides the contractual terms for use of a license. Although, the licensing agreement can be sent or given to a license purchaser upon purchase or shortly thereafter, incorporating it into the license itself facilitates ease of access after installation, for example, using a graphical user interface. Finally, it should be noted that all or substantially all licensing data 230 can be encrypted to increase security and thereby lessen the risk that an individual will be able to circumvent the license enforcement system 100.

Figure 4:
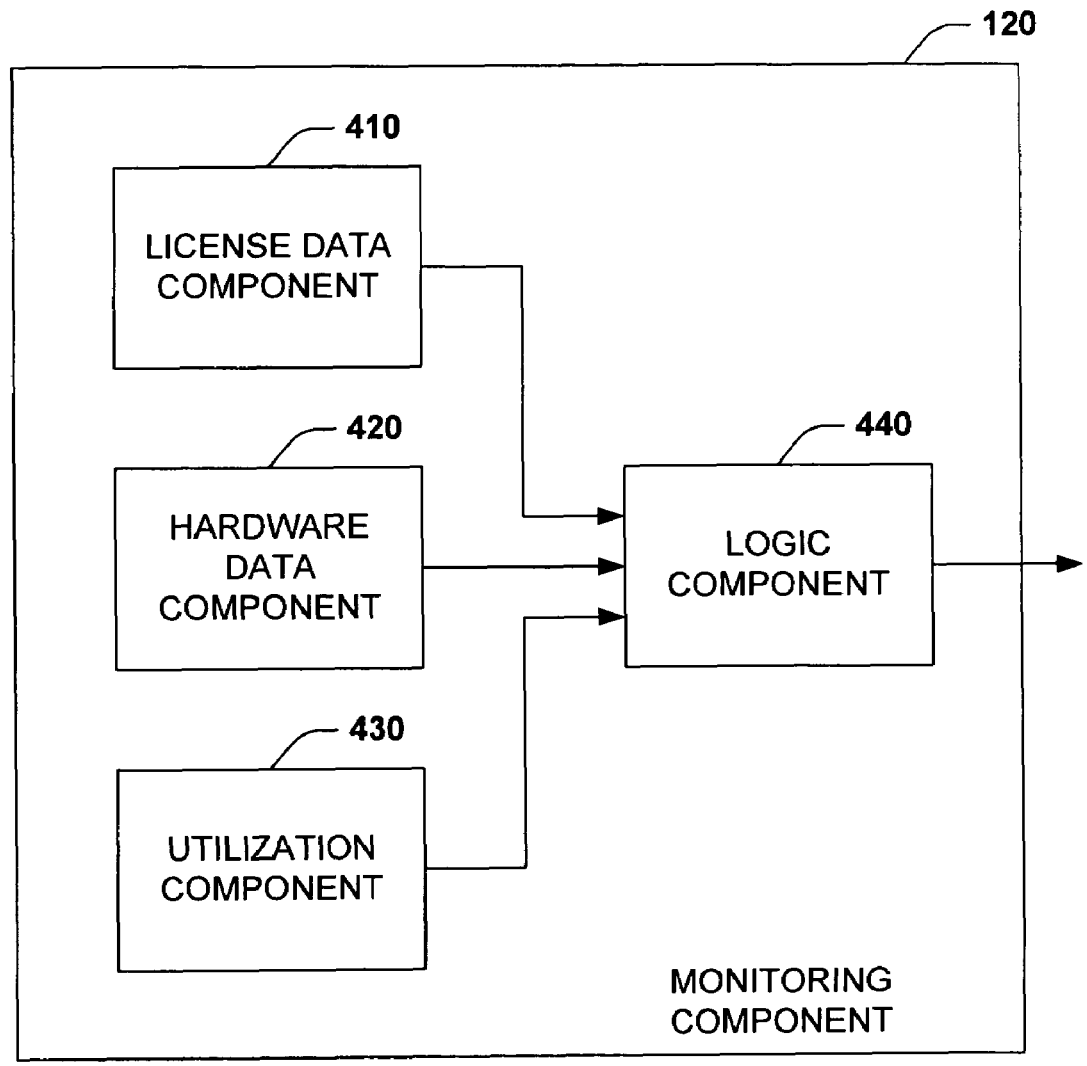
FIG. 4 is a block diagram of a monitoring component in accordance with an aspect of the subject invention.

Turning your attention to FIG. 4, the monitoring component 120 of FIG. 1 is illustrated in further detail. Monitoring component 120 comprises a license data component 410, and hardware data component 420, a utilization component 430 and a logic component 440. License data component 410 retrieves license data from data store 110, such as number of licenses and the hardware ID. Hardware data component 420 retrieves data from the computing device utilizing the licensing enforcement system so that it can be compared to the hardware ID recorded upon installation of the licensing component. Utilization component 430 monitors the use of and access to licensed software and provides such information to the logic component 440. Logic component 440, therefore, can receive license data from license data component 410, hardware data from hardware data component 420 and utilization data from utilization component 430. Logic component 440 can then utilize the received data to determine whether user(s) of a system are appropriately licensed or whether someone is trying to circumvent the license enforcement system. In one example, the logic component 440 can monitor the number of users that are accessing a particular application and compare that to the number of authorized licenses that a computing device has for the particular application. If the number of users of a particular application is more than the number of authorized licenses for the same application, than the logic component can pass information along to the enforcement component indicating non-compliance. In another example, the logic component of monitor 120 can periodically check (e.g., on system start-up) whether the hardware data collected is substantially the same as that which is indicated by the hardware ID. If it is not, then the user may be attempting to use the license on an additional machine in violation with a licensing agreement. Accordingly, the enforcement component can be notified of this situation as well. However, it should be noted that a sufficient tolerance should be used when comparing the hardware data collected to the hardware data indicated by the hardware ID that was present upon initial installation of the license so as to account for system improvements (e.g., more RAM added, new processor). Furthermore, it should be noted that software producers can also utilize the monitoring component 120 in other ways to enforce terms of licensing agreements. For instance, a software developer may make a license contingent upon using a computing device in a particular fashion, such as the primary device controller (PDC) and not as a member server or workgroup server. In such a situation, the hardware data component 420 can be programmed to periodically produce data regarding particular configurations such that a logic component can determine whether a user is respecting the conditions of the license. In yet another conceived use, a license may restrict the use of other programs in conjunction with licensed programs (e.g., if a particular program causes the licensed programs to crash, or produce incorrect results). This license restriction could easily be enforced by using the utilization component 430 to monitor applications on a system. Thereafter, the logic component 440 can compare the permissible programs or impermissible programs specified by the license with the programs that are actually on a computing system. Moreover, it should be appreciated that the monitoring component 120 can be programmed to monitor almost any licensing condition that can be specified so that compliance with the license condition can be enforced.

Monitoring component 120 should always be running during operation of a computer system using the license enforcement system of the present invention except if there is a valid bypass component in place. Licensing provides a vital revenue source for software companies and developers, but it is an inconvenience for users. Furthermore, many companies and individuals rely on licensed software in running their businesses and coping with everyday life. As a result, denying access or shutting down a system running licensed software applications in violation of the licensing agreement is a drastic response that impacts businesses and individuals in a very significant way. Thus, this type of remedy should only be employed when necessary and not by mistake. To this end, the present invention can employ a bypass component. A bypass component is a preventative mechanism that allows a user to continue using an application even when the machine or network is in an unexpected state that would otherwise warrant shutting down the machine and/or denying a user access to particular licensed software until the problem can be identified and remedied. According to an aspect of the present invention the bypass component can be a license component such as license component 200 with a special license code or range of license codes to identify it as such. A bypass component can be installed and activated (e.g., tied to a particular machine) just like any other license component. However, unlike some license components the bypass component is temporary in that it is only effective for a limited period of time (e.g., 30 days) so that problems with a system can be remedied. During the time that the bypass component is effective, license violations will not be acted on by the enforcement component and/or not detected by the monitoring component by disabling particular functionality with respect to one or both components. However, other self-protecting checks such as monitoring the validity of the license store and ensuring the license system itself is not disabled still remain active during the bypass period. Upon termination of a specific bypass period provided by a bypass component, the license enforcement system will reactivate the particular functionality disabled by the bypass component. If additional time is needed to remedy a problem situation then a software developer or company can issue another temporary bypass component for a user to install and activate.

License activation can be utilized to reduce the risk of casual copying of licenses. Activation allows software companies to more directly monitor the use of distributed software by requiring purchased licenses to be activated before the license can be installed on a computing system. Casual copying is perhaps the most well known type of piracy, which is characterized by copying and sharing software. For example, a business purchases an application for a user's business computer and the user subsequently installs the application on all of their home computers or distributes the application to friends, family, and/or co-workers for installation on their computers. The present invention seeks to employ activation in conjunction with licensing technology to ensure that licenses are not easily copied and distributed.

Figure 5:
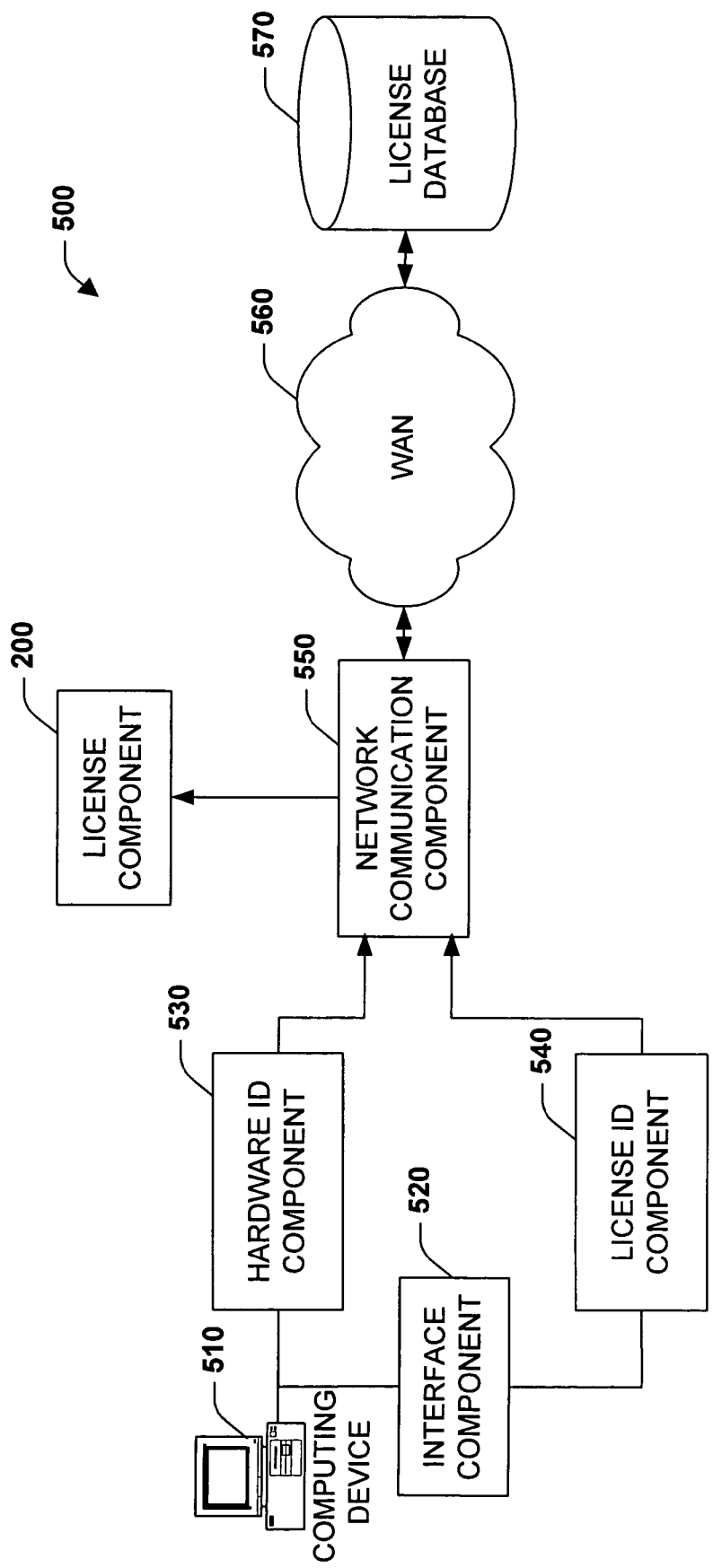
FIG. 5 is a block diagram of a license activation system in accordance with an aspect of the subject invention.

FIG. 5 is a block diagram of an activation system 500 in accordance with an aspect of the present invention. Activation system 500 comprises computing device 510, license component 200, hardware ID component 530, interface component 520, license ID component 540, network communication component 550, wide area network (WAN) 560, and license database 570. Computing device 510 can be any processor-based system capable of executing software including but not limited a computer, personal digital assistant (PDA), pager, and mobile phone. License component 200 is a computer program product or unit of license installation including several subcomponents capable of triggering and interacting with the activation system 500. License component 200 is a mechanism for adding one or more digital licenses to a system, such as computing device 510. In this exemplary system, license component 200 is to be activated by system 500. Hardware ID component 530 generates a unique hardware identification code or number from data retrieved from a computing device 510. To generate this unique code or number the component 530 interrogates computing device 510 to acquire information about computer parts including but not limited to the random access memory (RAM), motherboard, processor, sound card, hard drive, network adapter, and display adapter. The hardware ID component 530 then produces the unique code to identify computing system 510 by its hardware. License ID component 540 retrieves a license code associated with the license component to be activated. The license code according to one aspect of the invention can be retrieved from a user by manual keyboard entry using interface component 520. However, the interface component 520 may alternatively electronically retrieve the code from another location or from a different device such as a bar code scanner, for instance. Both hardware ID component 530 and license ID component 540 can provide their respective codes either individually or combined into a yet another code (e.g., installation code) by code generation component (not shown) to network communication component 550. Network communication component 550 receives the code or codes and transmits them to a license database 570 via wide area network (WAN) 560. A WAN 560 is a communication network that spans a large geographic area (e.g., nationwide, worldwide) and generally consists of the several interconnected local area networks (LANs) and metropolitan area networks (MANs). According to an aspect of the invention, WAN 560 corresponds to the Internet, the largest known WAN today. The WAN 560 provides the code(s) provided by the hardware ID component 530 and the license ID component 540 to a license database 570. The license database 570 verifies the license code to ensure its authenticity, saves the hardware ID and license code, and generates an activation code or confirmation ID that corresponds to the provided license code. The license database then transmits the activation code back over WAN 560 to the network communications component 550. The network communication component then provides the required activation code as input to the license component 200.

Figure 6:
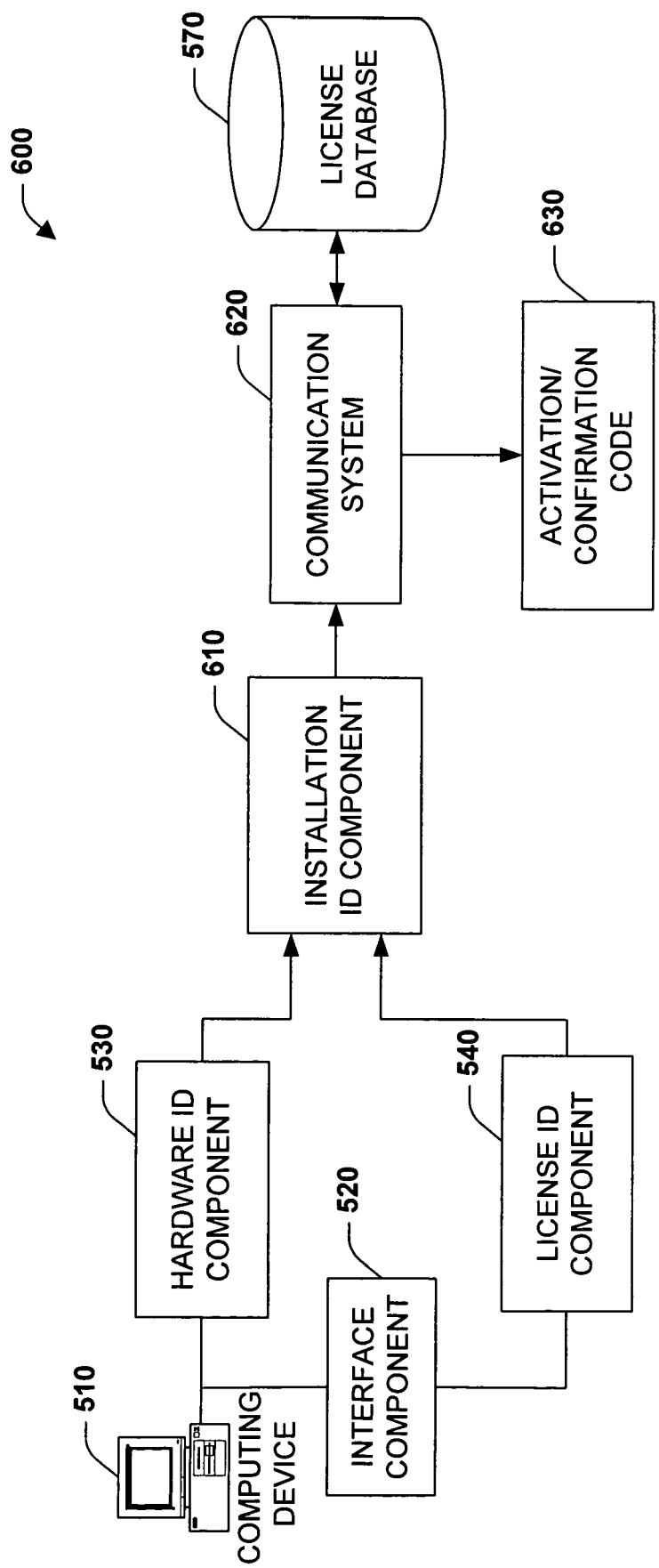
FIG. 6 is a block diagram of a license activation system in accordance with an aspect of the subject invention.

FIG. 6 is a block diagram of an activation system 600 in accordance with an aspect of the present invention. Although similar results are accomplished, namely activation of a license, activation system 600 is different than system 500 in that it employs substantially more human intervention. System 600 provides an alternative approach to activation for those who do not have access to a WAN or simply prefer not to use it. Activation system 600 comprises a computing device 510, hardware ID component 530, license ID component 540, installation ID component 610, communications system 620, license database 570, and activation/confirmation code 630. As in system 500, computing device 510 can be any processor-based system capable of executing software including but not limited a computer, personal digital assistant (PDA), pager, and mobile phone. Hardware ID component 530 generates a unique hardware identification code or number based on data obtained about its component hardware parts. License ID component 540 retrieves a license code associated with a license component to be activated. The license code according to one aspect of the invention can be retrieved from a user by manual keyboard entry using interface component 520 or by alternative means including but not limited to employing a bar code scanner or voice recognition technology. Both hardware ID component 530 and license ID component 540 can provide there respective codes to installation ID component 610 which generates an installation ID code. A communication system, such as a telephone network, is then used to communicate this installation ID code to another entity such as a customer support representative (CSR), which can retrieve an activation or confirmation code 630 based on the installation ID code. The confirmation code can then be entered using a user interface such as interface component 520 to activate the license or a wizard component as described hereinafter.

Figure 7:
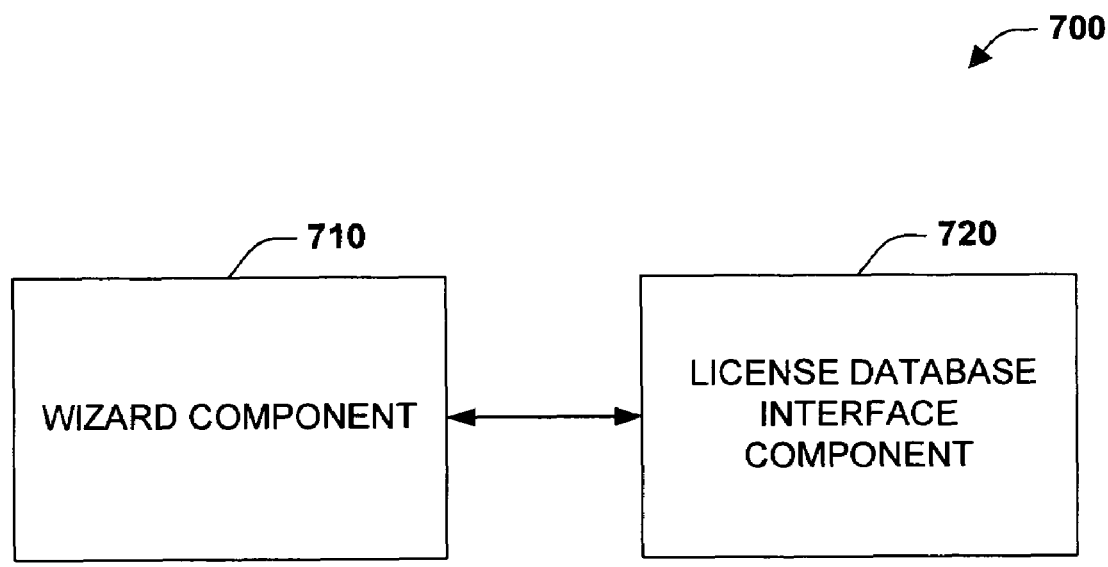
FIG. 7 is a block diagram of a system for adding and transferring licenses in accordance with an aspect of the subject invention.

FIG. 7 depicts a system 700 for adding or transferring licenses to a license enforcement system in accordance with an aspect of the subject invention. System 700 includes a wizard component 710 and a license database interface component 720. Wizard component 710 is a graphical user interface (GUI) that guides a user though the process or adding and activating a license. Wizard component 710 can include a sequence of related and/or optional interface objects that can include output display and input capabilities. Wizard component 710 interfaces with license enforcement system components such as license store 110 (FIG. 1), and other computer hardware and software components to enable an end-user to easily add and activate or transfer a license using a straightforward step-by-step process. License database interface component 720 is coupled to the wizard component 710 and provides access to the license database and activation or confirmation codes. Accordingly, a user can employ wizard component 710 to quickly and easily access activation codes in a remote license database using interface component 720, activate licenses, and add the activated licenses to a license store 110. Furthermore, upon permission of the licensor (e.g., software company) the wizard component 710 can be used to facilitate transferring licenses from one device to another device.

FIGS. 8-16 illustrate an exemplary wizard or graphical user interface for adding and activating licenses. Each figure illustrates a GUI including a plurality of images and interface objects or elements to facilitate guiding a user through a plurality of selection options associated with adding and activating a license. It should be noted, however, that these illustrations are provided by way of example and not limitation. As one of skill in the art can appreciate, there a multitude of ways to arrange and present graphical user interfaces. The depicted GUIs illustrate only one arrangement and are presented for purposes of clarity and understanding and not to limit the scope of the present invention.

Figure 8:
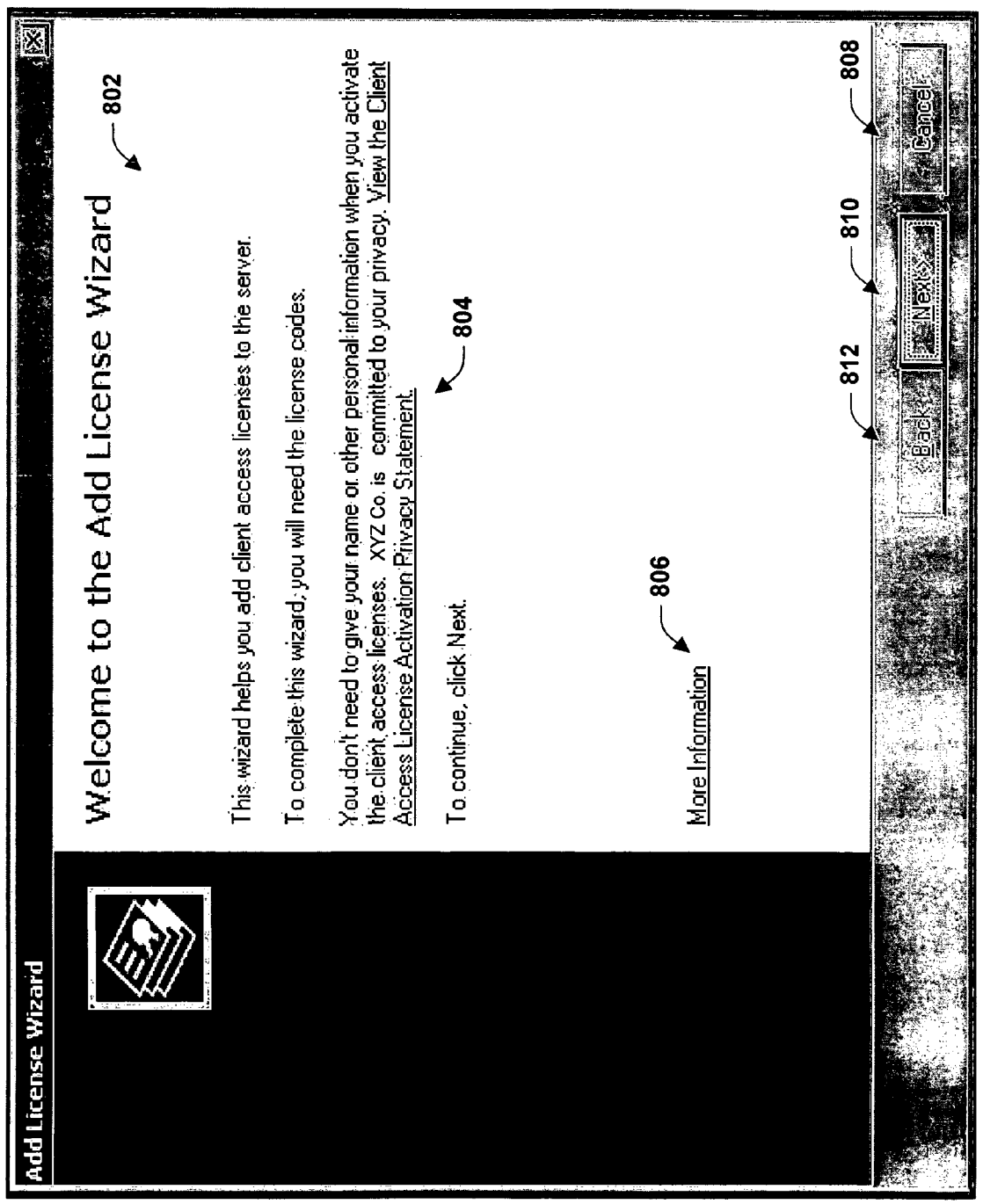
FIG. 8 illustrates an exemplary GUI associated with adding a license in accordance with an aspect of the present invention.

FIG. 8 illustrates a GUI 800 for adding a license. GUI 800 comprises a plurality of interface objects and images 802-812. At 802 text is depicted welcoming a user to the add license wizard and providing instructions for interacting therewith. Interface object 804 provides a link to view an activation privacy statement describing the information that will be collected and to whom it may be disclosed. A link to more information about the license wizard can be found at 806. Furthermore, interface objects 808-812 are buttons that provide a mechanism for navigating the wizard upon selection (e.g., by a mouse click). Button 808 can be employed to cancel or quit the wizard. Button 810 is provided as a mechanism for moving on to the next step in the license activating process. Button 810 is provided to go back to the previous page or step, however it is shown here as non-selectable as this is the first step or page in of the GUI. Upon selection of the next button a user will be transported to GUI of FIG. 9.

Figure 9:
FIG. 9 depicts an exemplary GUI associated with adding a license in accordance with an aspect of the subject invention.

FIG. 9 illustrates another GUI 900 for adding a license. GUI 900 is concerned with the license agreement. At 902 the license agreement is provided in a text box that is scrollable using scroll bar 904. Radio buttons are provided at 906 and 908 for indicating whether the user agrees to abide by the license agreement displayed at 902. If the user agrees than they can select "I agree" at 906. If the user does not agree then they can select "I don't agree" at 908. Navigational buttons 910-912 are provides to go to the cancel, go to the next page, or go back. It should be noted here that next button 912 is not selectable unless the user agrees to abide by the licensing agreement by selecting radio button 906. Otherwise, the user must cancel the wizard by selecting cancel button 910 or go back to the previous page by selecting button 914.

Figure 10:
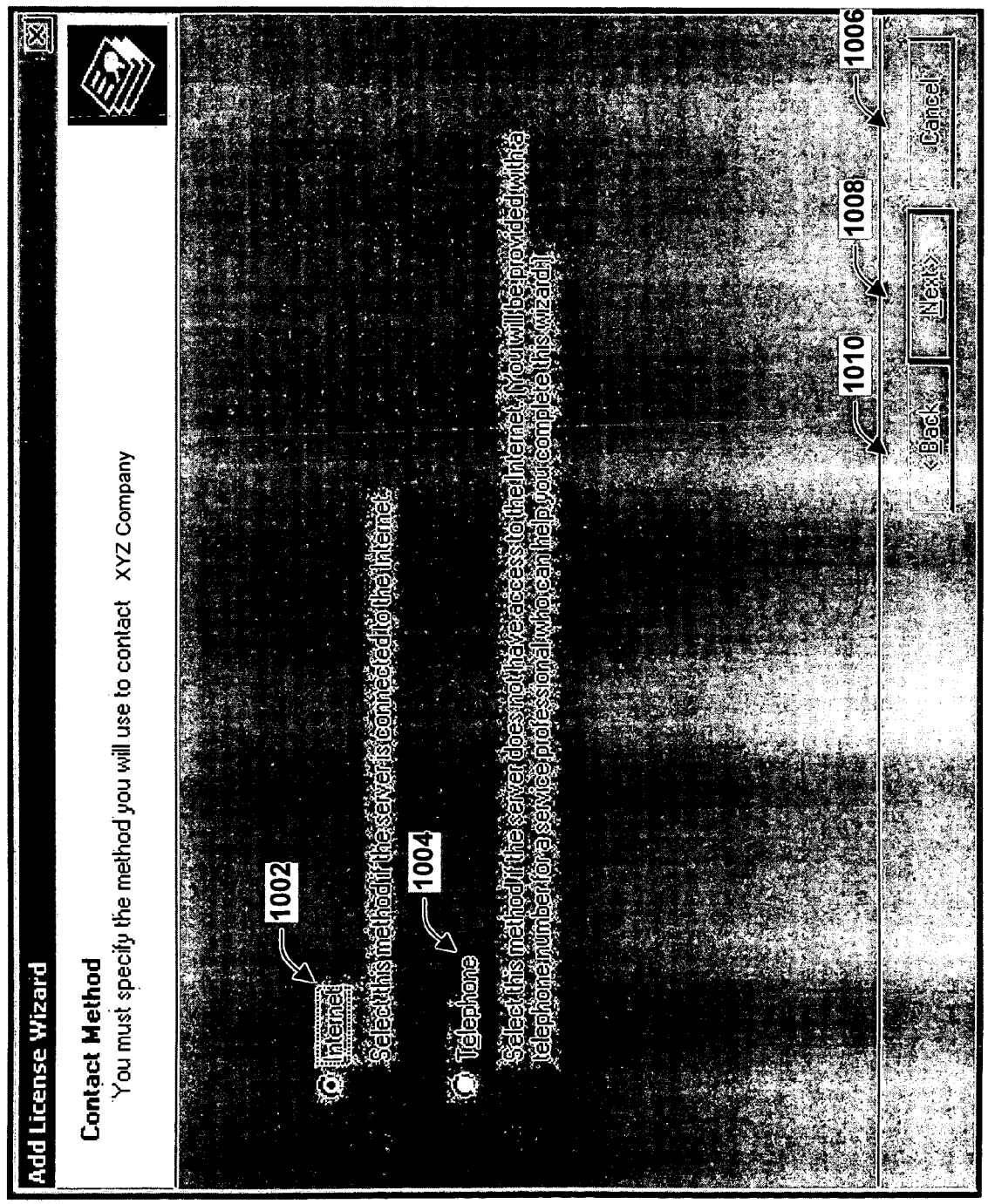
FIG. 10 illustrates an exemplary GUI associated with adding a license in accordance with an aspect of the present invention.

FIG. 10 depicts another exemplary GUI 1000 for adding a license. GUI 1000 allows a user to select a contact method. The contact method is the means for which the user desires to use to contact the license activation server. At 1002, a user can select a radio button specifying the internet as the contact method. Alternatively, the user can specify the telephone as a contact method by selecting radio button 1004. Finally the user can select navigation buttons 1006-1010 to either cancel go to the next page or go back to the previous page.

Figure 11:
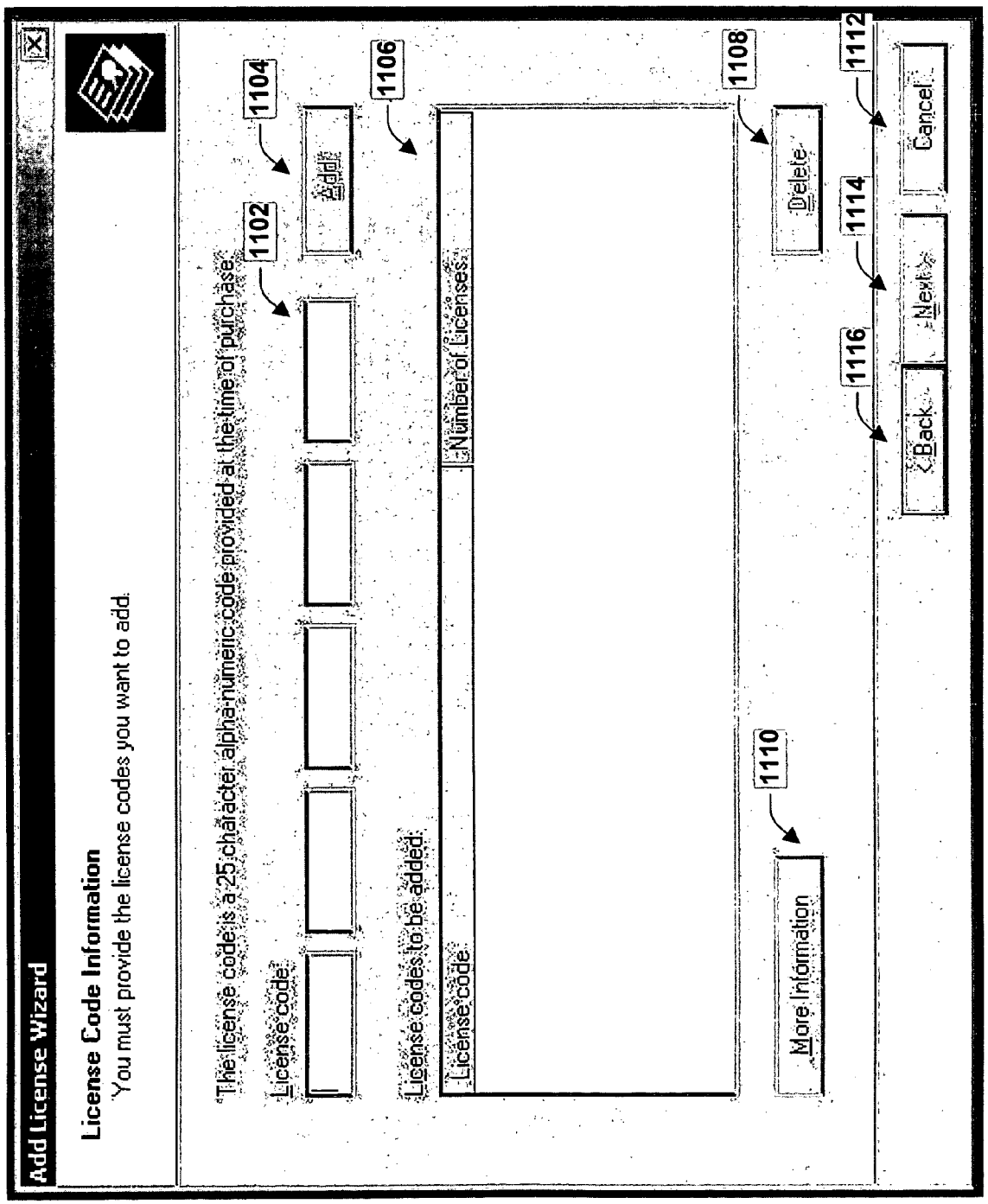
FIG. 11 illustrates an exemplary GUI associated with adding a license in accordance with an aspect of the present invention.
Figure 12:
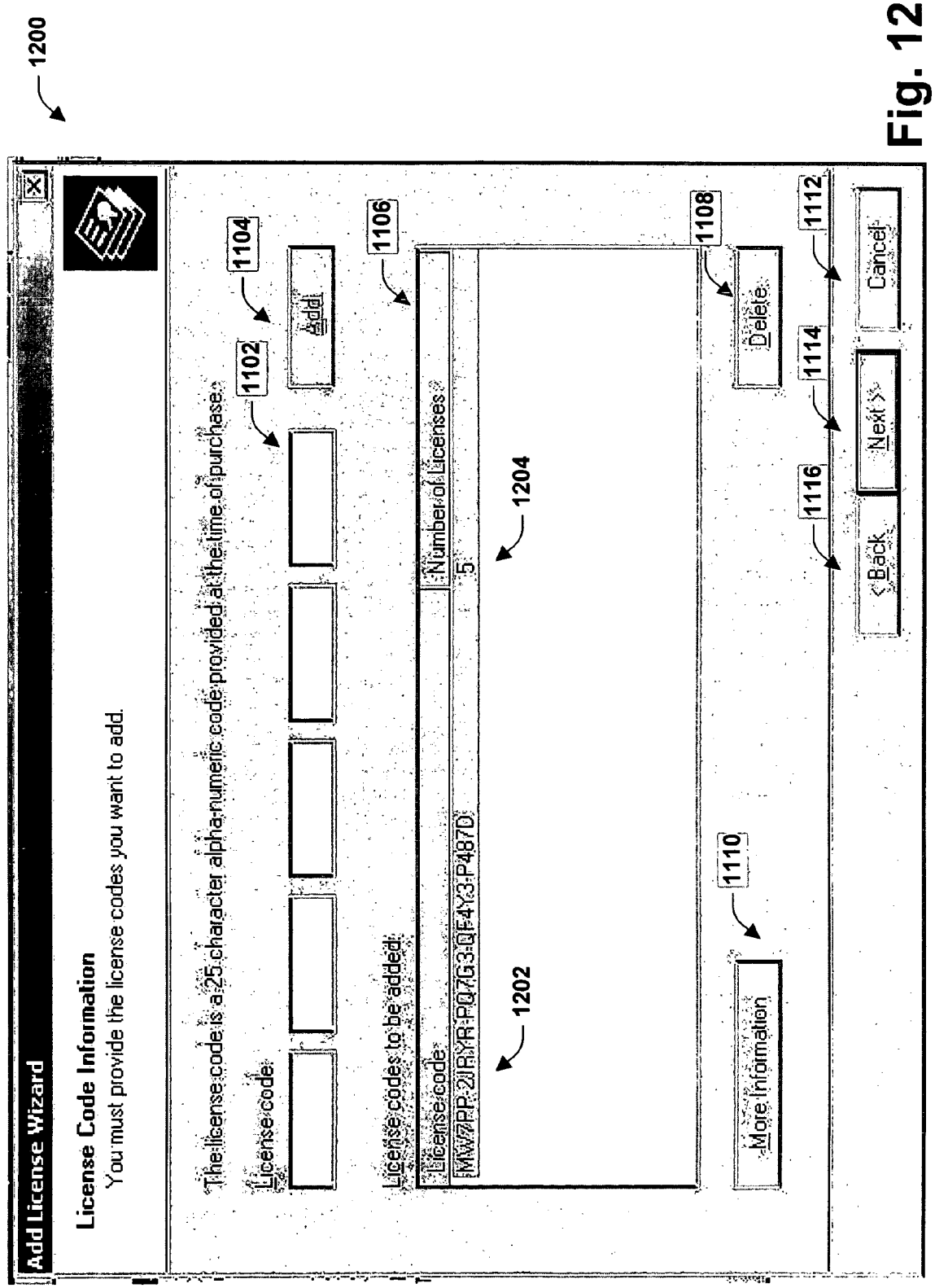
FIG. 12 depicts an exemplary GUI associated with adding a license in accordance with an aspect of the present invention.

FIG. 11 illustrates a GUI 1100 for adding a license. GUI 1100 is concerned with license code information. A license code is a code associated with a license that is provided at the time of purchase or shortly thereafter (e.g., on a jewel case, by email, by mail, on an order web page . . . ). A user can enter the respective numbers and letters in the boxes provided at 1102. Thereafter, add button 1104 will become selectable. Upon selection of button 1102 the license code and associated number of licenses can be displayed in interface-object box 1106. Turing briefly to FIG. 12 a GUI 1200 is illustrated showing the result of entering a license code in license boxes at 1102. As shown, the license number 1202 and the number of license 1204 are added to the interface-object box 1106. Turning back to FIG. 11, once a license code is added to interface-object box 1106 delete button 1108 will become selectable (as in FIG. 12). A user can select delete button 1008 if they wish to delete one or more added license codes and associated number of licenses from box 1106. Furthermore, at 1110 a button is depicted which upon selection can display more information about license code information and how to interact with GUI 1100. Once again, navigational buttons 1112-1116 are provided to cancel, go to the next page, or go back to the previous page. Note that the next button 800 is not selectable until a valid license code is entered at 1102 and added by selecting button 1104 (as shown in FIG. 12). Upon selection of the next button the GUI will attempt to add and activate the licenses displayed in box 1106. Thereafter a message such as "Please wait while the licenses are being activated," can be displayed (not shown) to indicate the status of the operation to a user.

Figure 13:
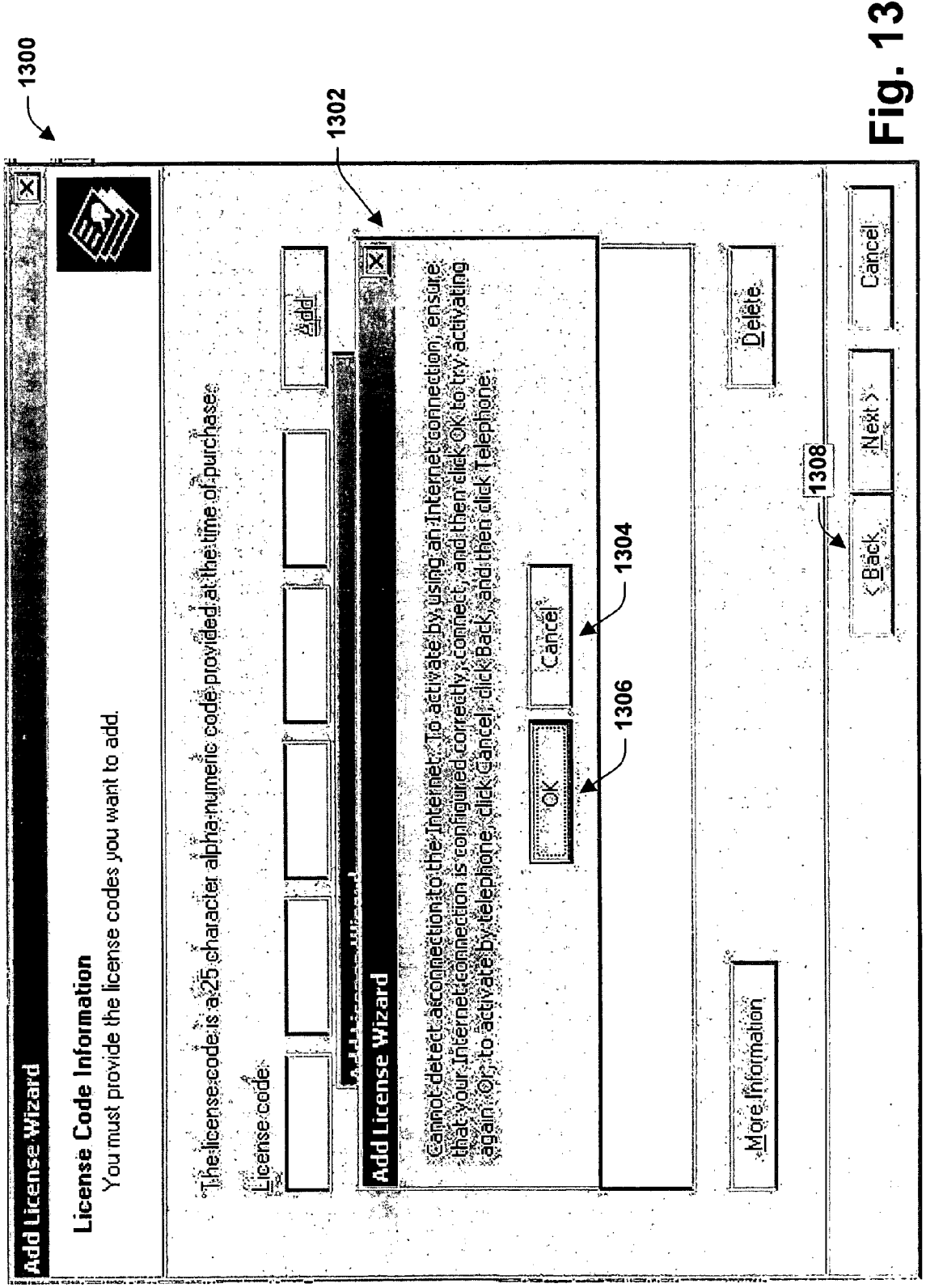
FIG. 13 illustrates an exemplary GUI associated with adding a license in accordance with an aspect of the subject invention.

FIG. 13 depicts a GUI 1300 associated with adding a license. GUI 1300 can appear when a user has selected the Internet contact method using GUI 1000 and the interface cannot detect a connection to the Internet to activate one or more licenses. Pop-up window 1302 notifies the user of this complication and provides the user with options for dealing with this problem. For example a user can select cancel button 1304 and then use the navigational back button 1308 to go back and select the telephone contact method. Alternatively, a user can select OK button 1306 and attempt, again, to connect to the Internet.

Figure 14:
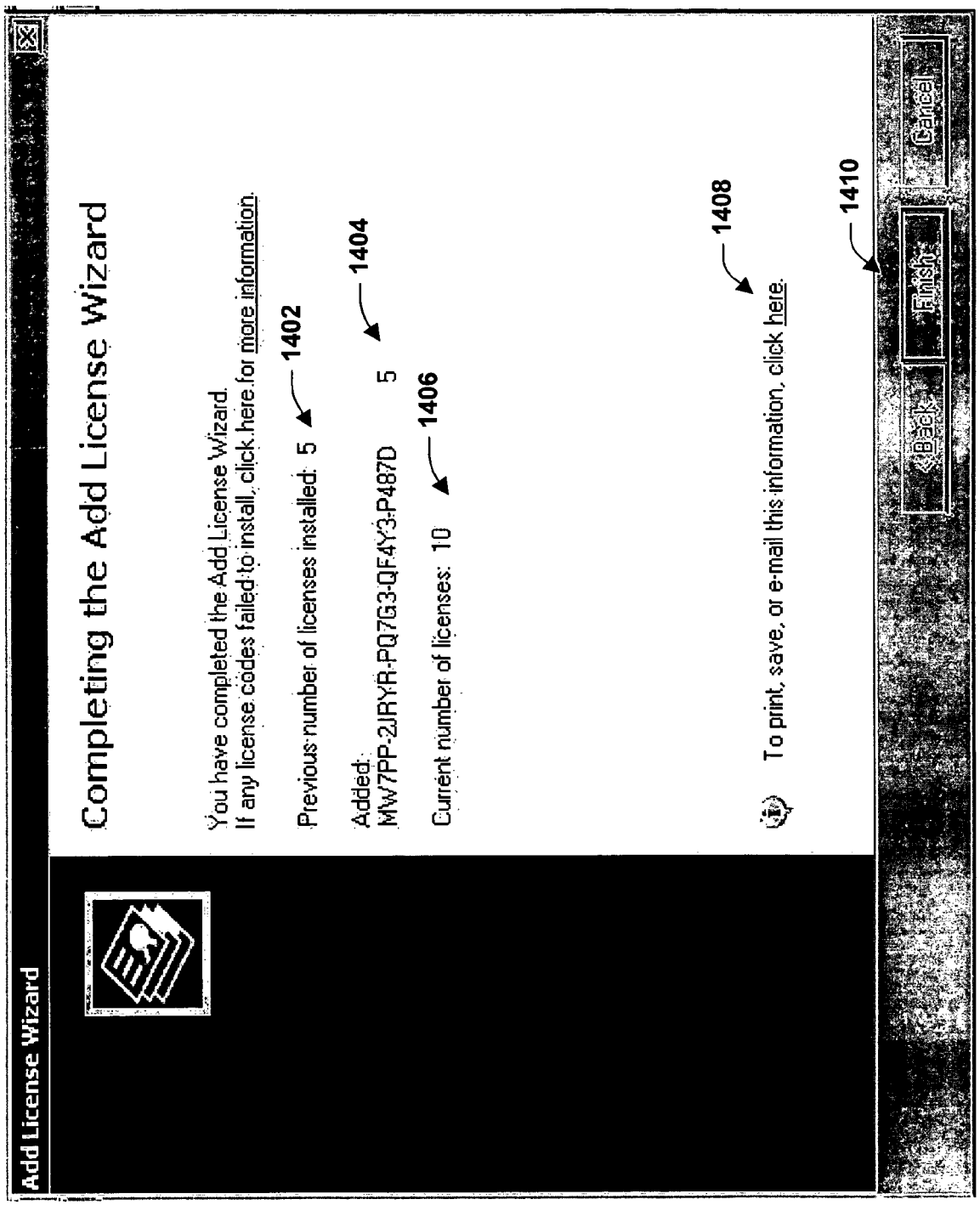
FIG. 14 illustrates an exemplary GUI associated with adding a license in accordance with an aspect of the present invention.

FIG. 14 illustrates a GUI 1400 associated with adding a license. GUI 1400 can be displayed upon successful addition and activation of a license. Statistics regarding licenses can then be shown such as the previous number of licenses at 1402. At 1404, the newly added license code and associated number of license can be display, and at 1406 the current total number of licenses can be displayed. Additionally, a link 1408 can be provided which activates functionality capable of printing, saving, or emailing the displayed statistics. Finally, the finish interface button 1410 is displayed. Upon selection of the finish button 1410 the wizard will close successfully.

Figure 15:
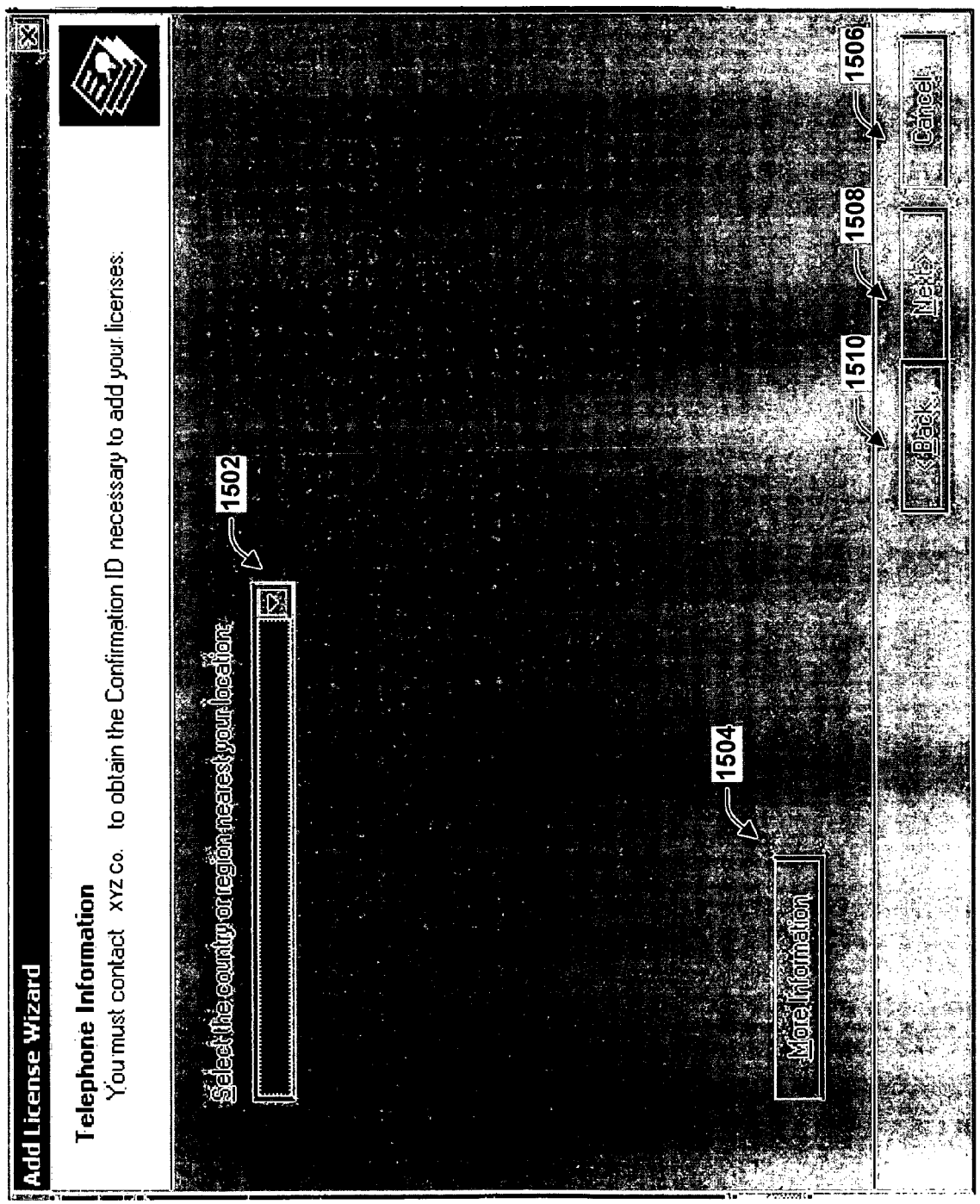
FIG. 15 depicts an exemplary GUI associated with adding a license in accordance with an aspect of the present invention.

FIG. 15 depicts a GUI 1500 associated with adding a license. GUI 1500 can be displayed when the telephone activation method is selected in GUI 1000. A pull-down menu 1502 is provided to select a country or region nearest the user's location to enable the GUI to provide appropriate telephone number for that country or region. If the user desires more information about this GUI or the information provided thereon the user can select the more information button at 1504. Navigational buttons 1506-1510 are also provided for canceling the wizard, going to the next page, or going back to the previous page. It should be noted, however, that the next button 1508 may not become selectable until the country or region is selected using the scroll bar 1502. This forces the user to provide complete information.

Figure 16:
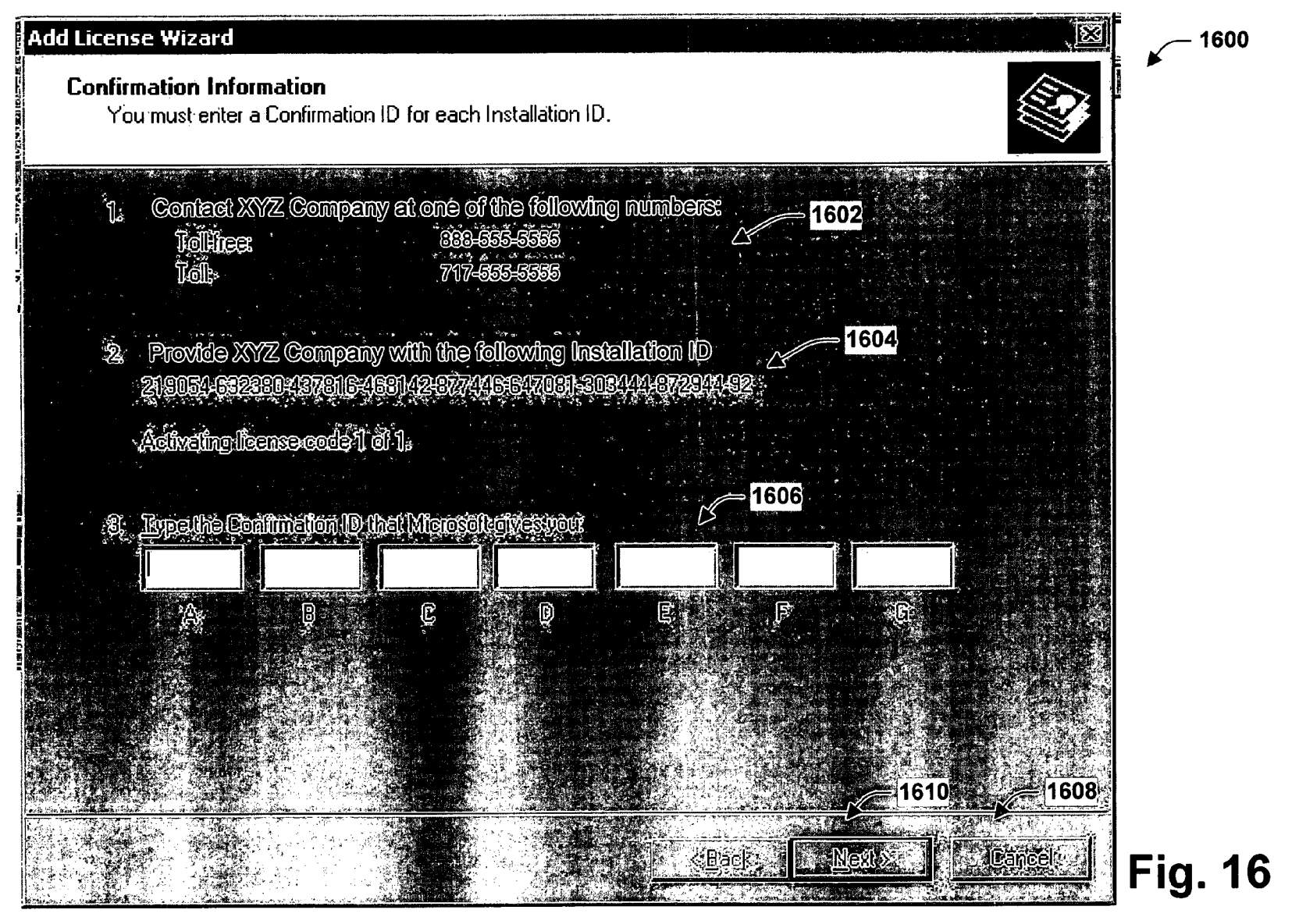

FIG. 16 is an illustration of a GUI 1600 for adding a license. GUI 1600 provides a user with information and an input interface object for activating a license over using a telephone. At 1602, telephone numbers are provided to contact the entity responsible for activating licenses. At 1604, the user is provided with an installation ID associated with the particular product and computing device to which the license is being added and activated. The user can then call one of the numbers provided for at 1602 and read a representative the installation ID. Thereafter, the representative can give the user a confirmation or activation ID which the user can type into the boxes provided for at 1606. GUI 1600 also provides buttons 1608 and 1610 for canceling the wizard and going to the next page. If the confirmation ID is entered correctly the next GUI will be similar to GUI 1400, which indicates successful activation of a license and provides the user with some other information. If the confirmation ID is entered incorrectly the next GUI will be similar to GUI 1300, where a pop-up notifies the user of the incorrect entry of the confirmation ID.

GUIs for transferring licenses to other devices can be similar to adding a license. Generally, license transfers are not allowed given hardware restrictions (binding software to hardware), however a licensor can allow a license to be transferred or used on another device if they so desire. Additionally, the present invention could permit licensors to allow licensees to load a single license on a plurality of machine, although this could circumvent license enforcement. Transferring a license involves tying software to another machine. Accordingly, the license code will need to be transferred to the license database in order to receive an activation or confirmation ID associated with the licensed software product and the particular hardware executing the licensed software. According to one aspect of the invention, the telephone contact method is used to transfer licenses. Using the telephone method allows a software company representative to approve the license transfer for a myriad of reasons and activate the software on a new device. The license transfer system therefore adds flexibility to an otherwise strict licensing enforcement system.

Figure 17:
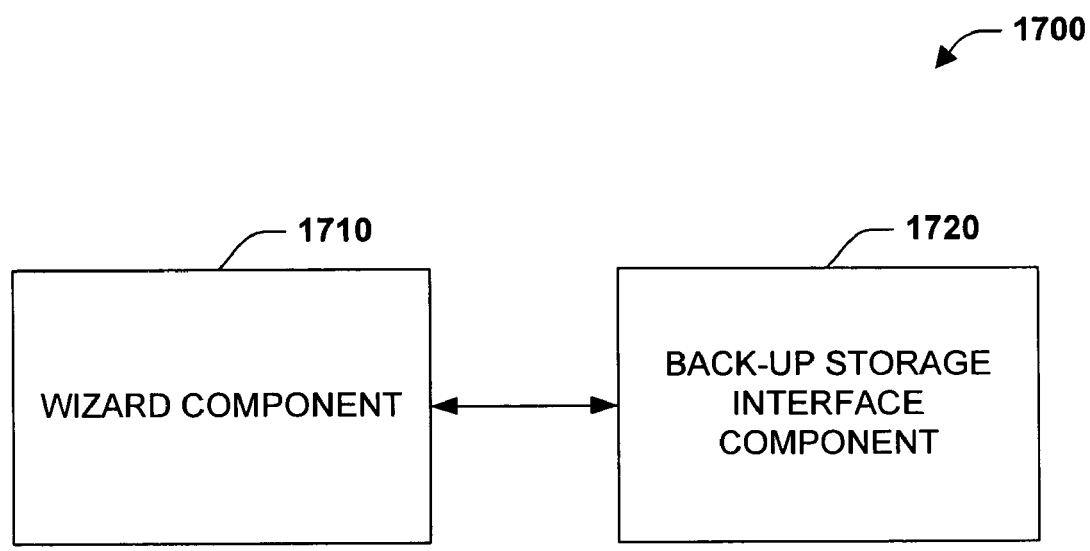
FIG. 17 is a block diagram of a system for backing up and restoring licenses in accordance with an aspect of the subject invention.

FIG. 17 depicts a system 1700 for backing up and restoring licenses in accordance with an aspect of the subject invention. System 1700 includes a wizard component 1710 and a backup storage interface component 1720. Wizard component 1710 is a graphical user interface (GUI) which can guide a user though a process of a backing-up and/or restoring licenses. Wizard component 1710 can include a sequence of related and/or optional interface objects or elements that can include output display and input capabilities. Wizard component 1710 interfaces with license enforcement system components such as license store 110 (FIG. 1), and other computer hardware and software components to enable an end-user to easily add and activate a license using a straightforward step-by-step process. Backup storage interface component 1720 is coupled to the wizard component 1710 and provides access to backup storage such as backup store 150 (FIG. 1). Accordingly, system 1700 enables a user employing wizard component 1710 to quickly and easily access backup licenses and associated data to a backup store and thereafter restore data from a backup store to a license store if and when it is necessary.

FIGS. 18-23 illustrate an exemplary wizard or graphical user interface for backing up and restoring licenses and associated license data. Each figure illustrates a GUI including a plurality of images and interface objects or elements to facilitate guiding a user through a plurality of selection options associated with adding and activating a license. It should be noted, however, that these illustrations are provided by way of example and not limitation. As one of skill in the art can appreciate, there are a multitude of different ways to arrange and present graphical user interface images and objects.

Figure 18:
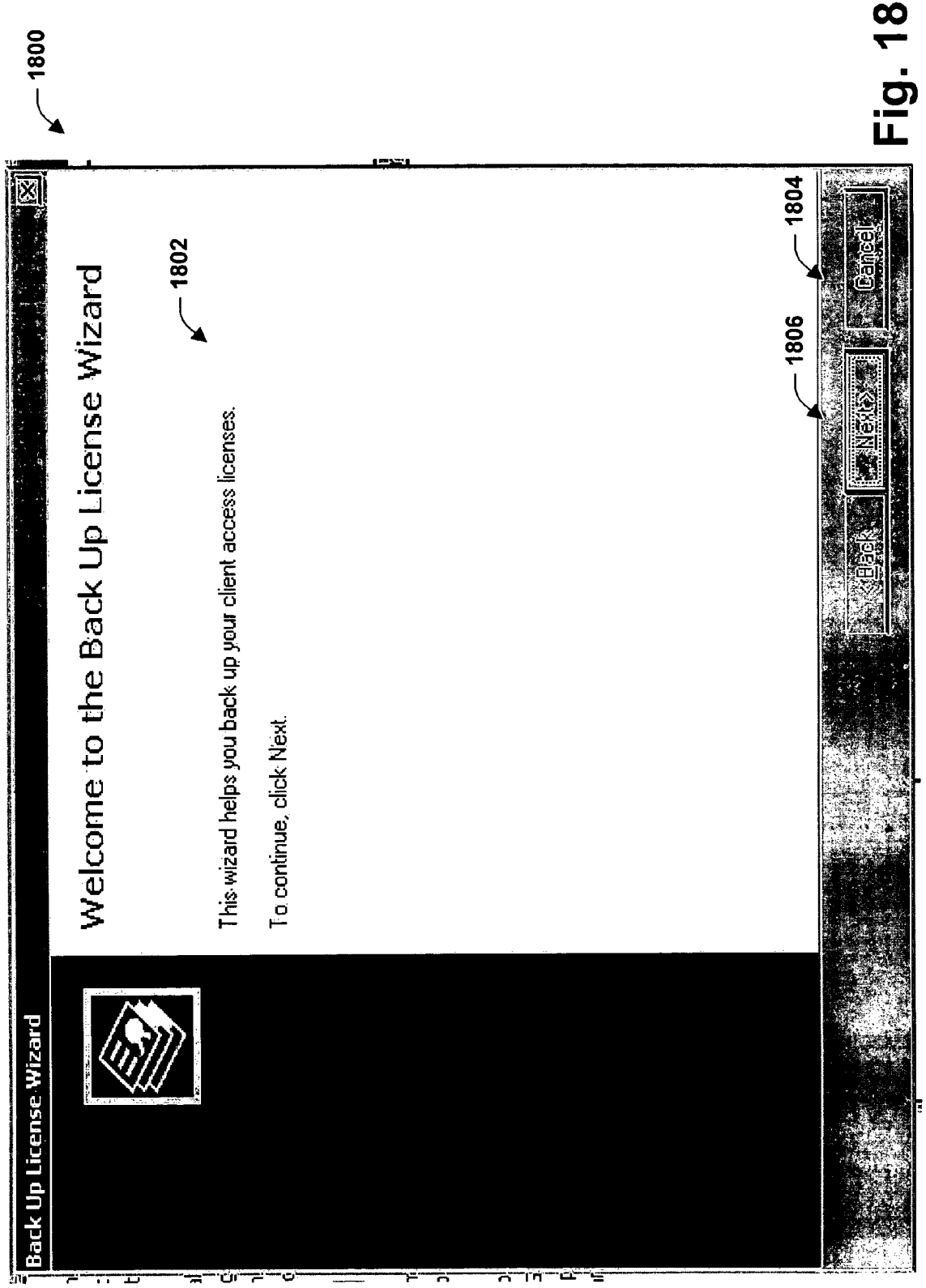
FIG. 18 is an exemplary GUI associated with backing up licenses in accordance with an aspect of the present invention.

FIG. 18 illustrates a GUI 1800 for backing up a license(s) in accordance with an aspect of the subject invention. GUI 1800 is a startup interface for backing up licenses. As shown, GUI 1800 contains text 1802 welcoming a user to the interface and giving them instructions. GUI 1800 also provides navigational interface objects in the form of buttons 1804 and 1806. Button 1804 provides a user with a mechanism to cancel the wizard. Button 1806 allows a user to advance to the next interface page.

Figure 19:
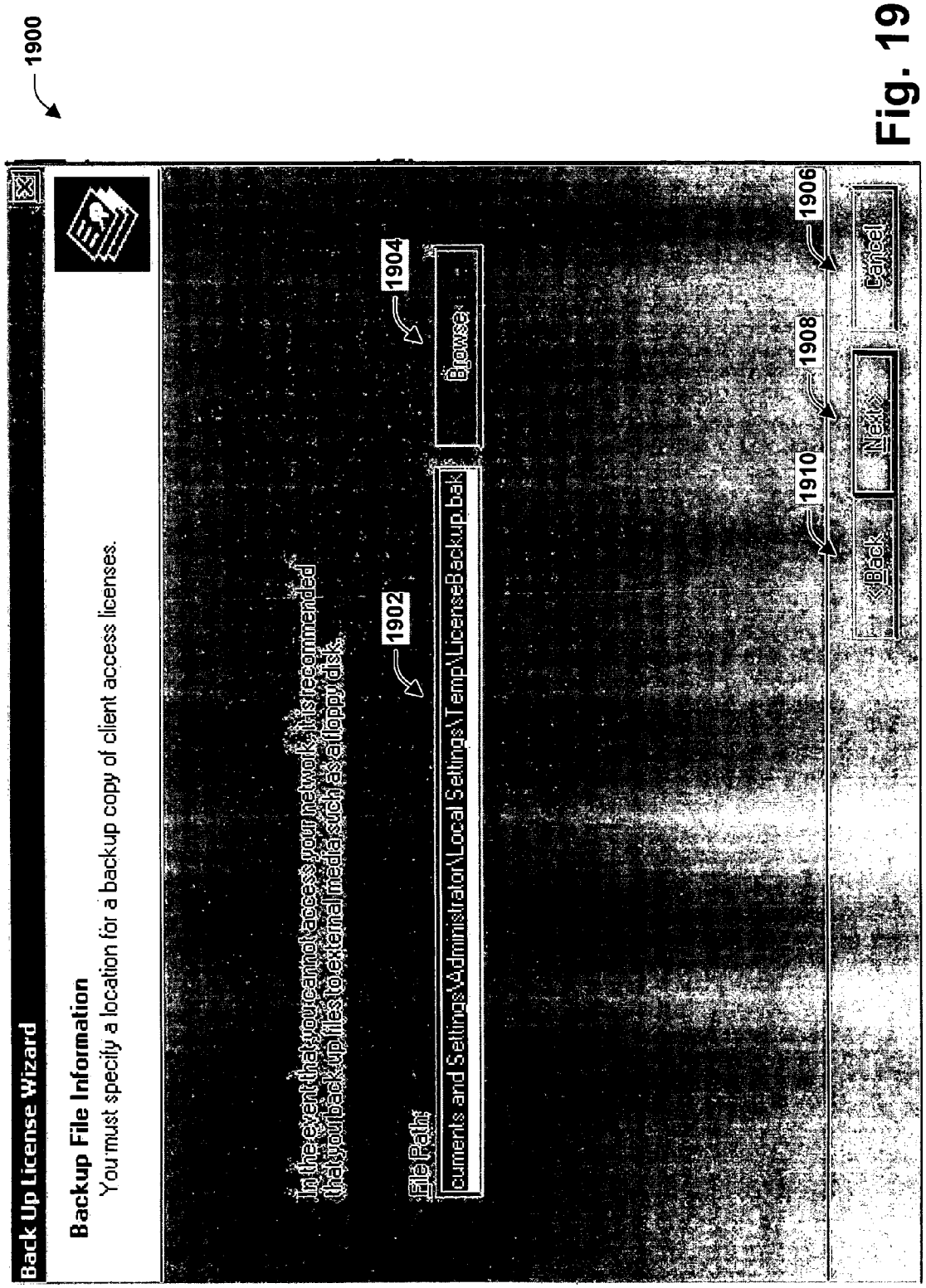
FIG. 19 illustrates an exemplary GUI for backing up licenses in accordance with an aspect of the present invention.

FIG. 19 depicts a GUI 1900 for backing up a license(s). GUI 1900 provides a mechanism for specifying a file path to store a copy of a license(s). GUI 1900 contains a file path text box 1902. A user can then type in a file path into text box 1902 to indicate where they would like to store a copy of a license(s). Additionally, GUI 1900 provides a browse button 1904 which upon selection can open up a pop-up window (not shown), for instance, showing a graphical representation of a storage directory from which a user can select a file path. The selected file path can then be displayed in text box 1902 just as if the user had manually entered such information. Navigation interface buttons 1906-1910 are also provided. Button 1906 can be selected if a user wishes to cancel and stop the initiated backup process. Next button 1908 can be utilized to move ahead to the next interface page, while back button 1910 can be selected and employed to move back to the previous interface page, in this case GUI 1800.

Figure 20:
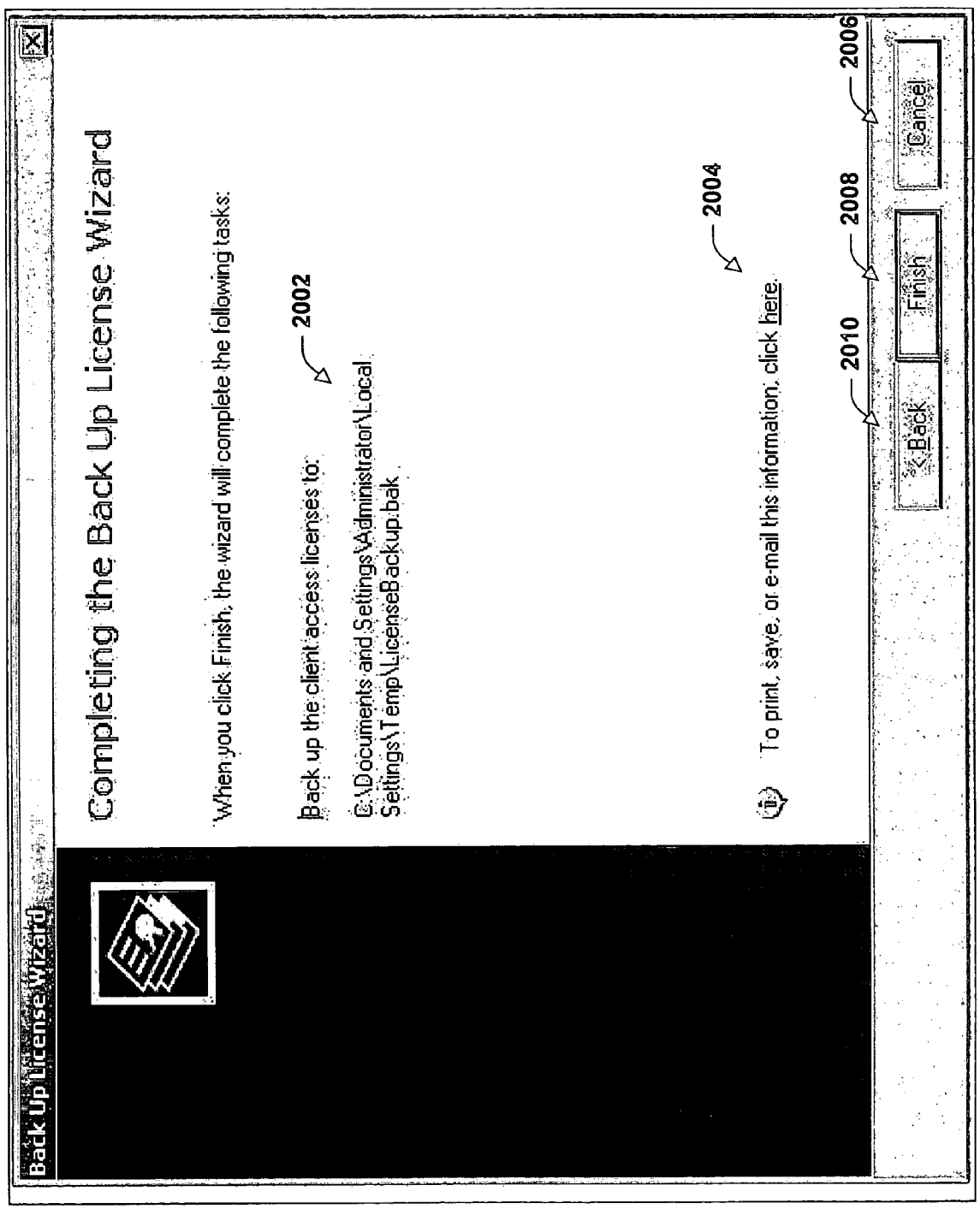
FIG. 20 depicts an exemplary GUI for backing up licenses in accordance with an aspect of the subject invention.

FIG. 20 illustrates a GUI 2000 for backing up a license(s). GUI 2000 provides information regarding the storage location and indicates to the user that the next step will be to actually store a copy of a license to the specified location. At 2002, text is shown indicating that a license will subsequently be backed up and the location where such backup copy will be stored. At 2004, a link is provided to allow a user to print, save, or email the backup information. Finally, navigational buttons 2006-2010 are provided. Button 2006 allows a user to cancel the backup process. Finish button 208, when selected, initiates the backup procedure described in the above text 2002, while back button 2010 allows a user to go back to the previous interface page, for example to change the location of the backup license.

Figure 21:
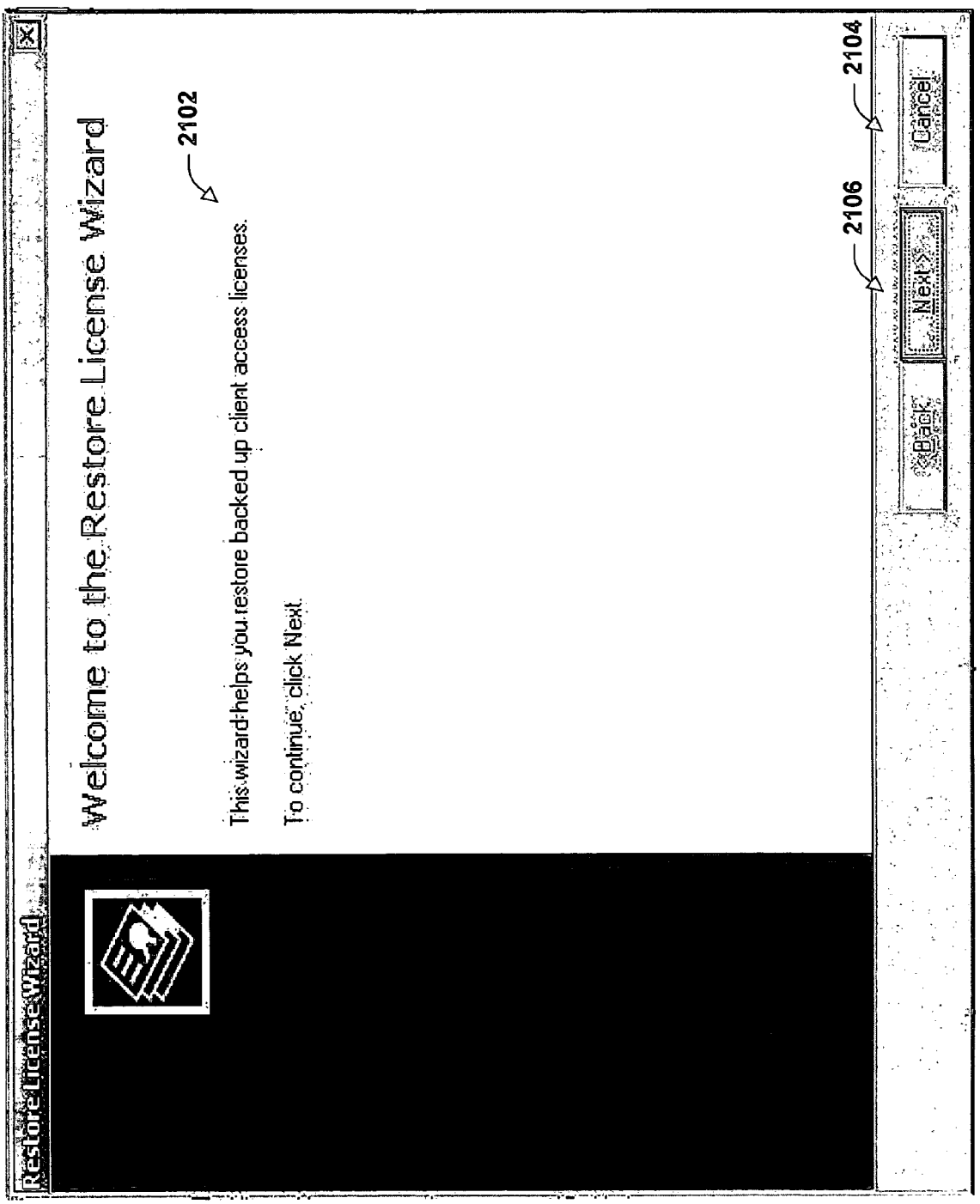
FIG. 21 illustrates an exemplary GUI for restoring licenses in accordance with an aspect of the present invention.

FIG. 21 depicts a GUI 2100 for restoring a license(s). GUI 2100 is a welcoming page. At 2102, text is displayed welcoming the user to the restore wizard and instructing the user to go to the next interface page. A cancel button 2104 is provided to allow a user to cancel the restore process, while the next button 2106 provides a mechanism to advance to the next set of interface images and objects.

Figure 22:
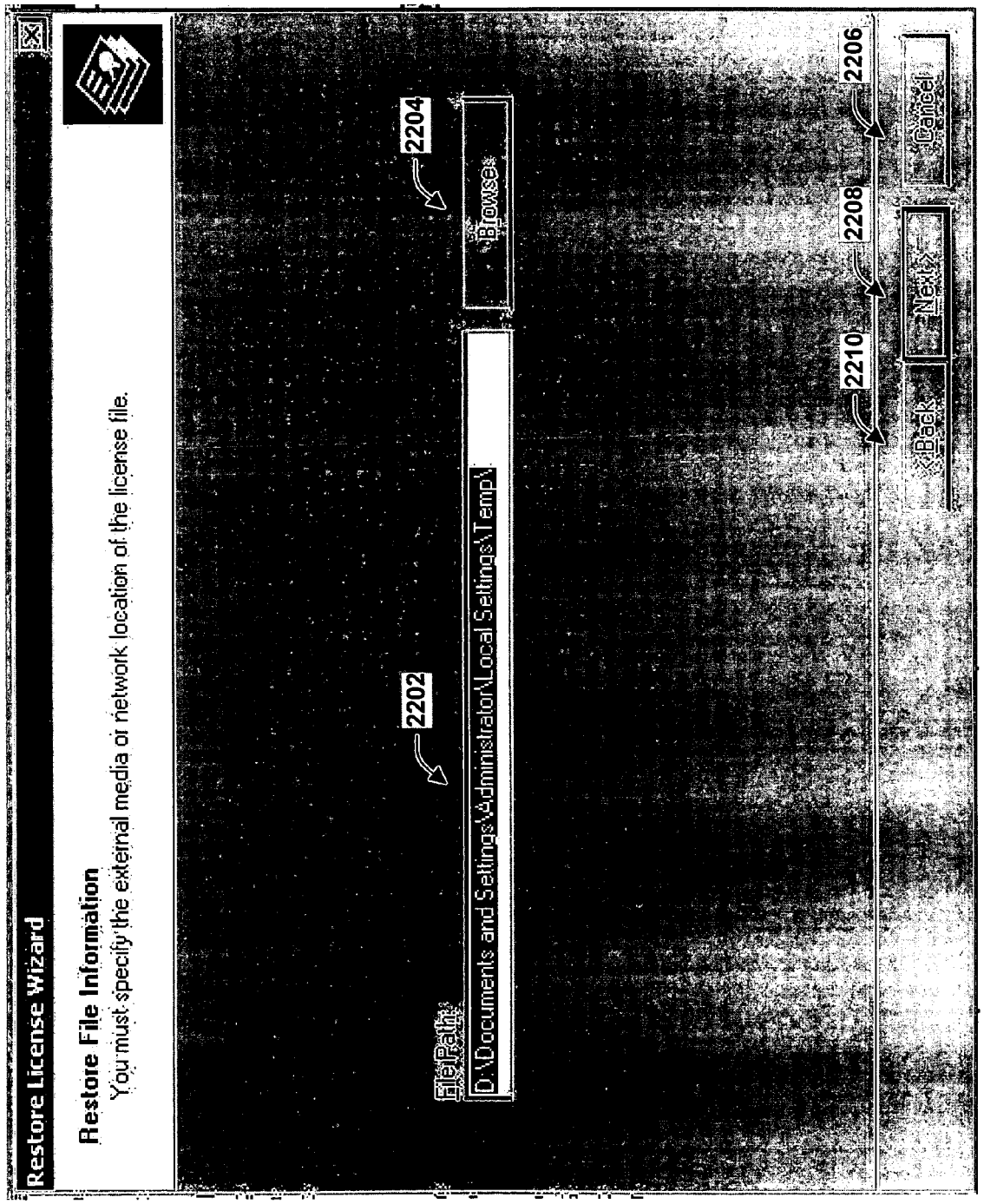
FIG. 22 illustrates an exemplary GUI for restoring licenses in accordance with an aspect of the subject invention.

FIG. 22 illustrates a GUI 2200 for restoring a license(s). GUI 2200 is specifically concerned with designating the location of the backup license. A text box 2202 is provided for a user to manually enter (e.g., type) the file path for a license. Additionally, a browse button 2204 is provided which upon selection can cause a pop-up window (not shown) with a graphical representation of a storage device file structure to be displayed. Upon selection by a user the file path information can be displayed in text box 2204 just as if the user had manually entered it. Navigational buttons 2206-2210 are also provided. The cancel button 2206 allows a user to cancel the restore process. The next button 2208 transitions the user to another interface with various interface objects or elements, and back button 2210 allows a user to step back one step in the restore process, here GUI 2100.

Figure 23:
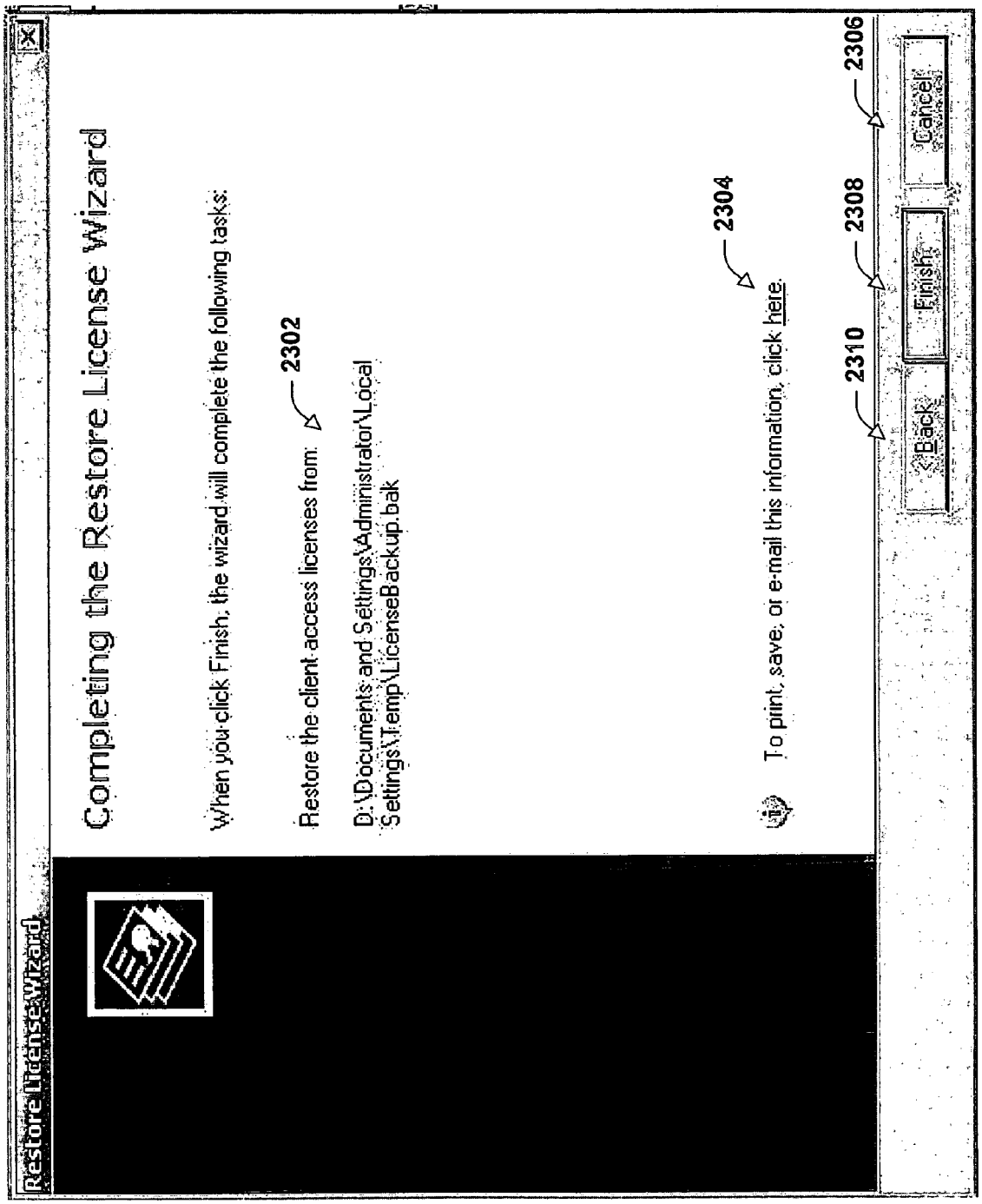
FIG. 23 depicts an exemplary GUI for restoring licenses in accordance with an aspect of the subject invention.

FIG. 23 depicts a GUI 2300 for restoring a license(s). GUI 2300 indicates the file path from which license copy is to be retrieved and notifies the user that the next step will be to retrieve the license copy and restore the license. At 2302, text is displayed indicating the location from which the license will be restored. GUI 2300 also provides a link 2304 to allow a user to print, save, or email information relating to the restoration of a particular license. Finally, GUI 2300 provides three buttons, a cancel button 2306, a finish button 2308, and a back button 2310. Cancel button 2306 enables a user to cancel the restoration process and exit the GUI. Finish button is the mechanism to initiate license restoration. Back button provides mechanism for returning the user to a previous interface page, for instance to specify a different backup copy location.

In view of the exemplary systems described supra, a methodology that may be implemented in accordance with the present invention will be better appreciated with reference to the flow charts of FIGS. 24-30. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 24:
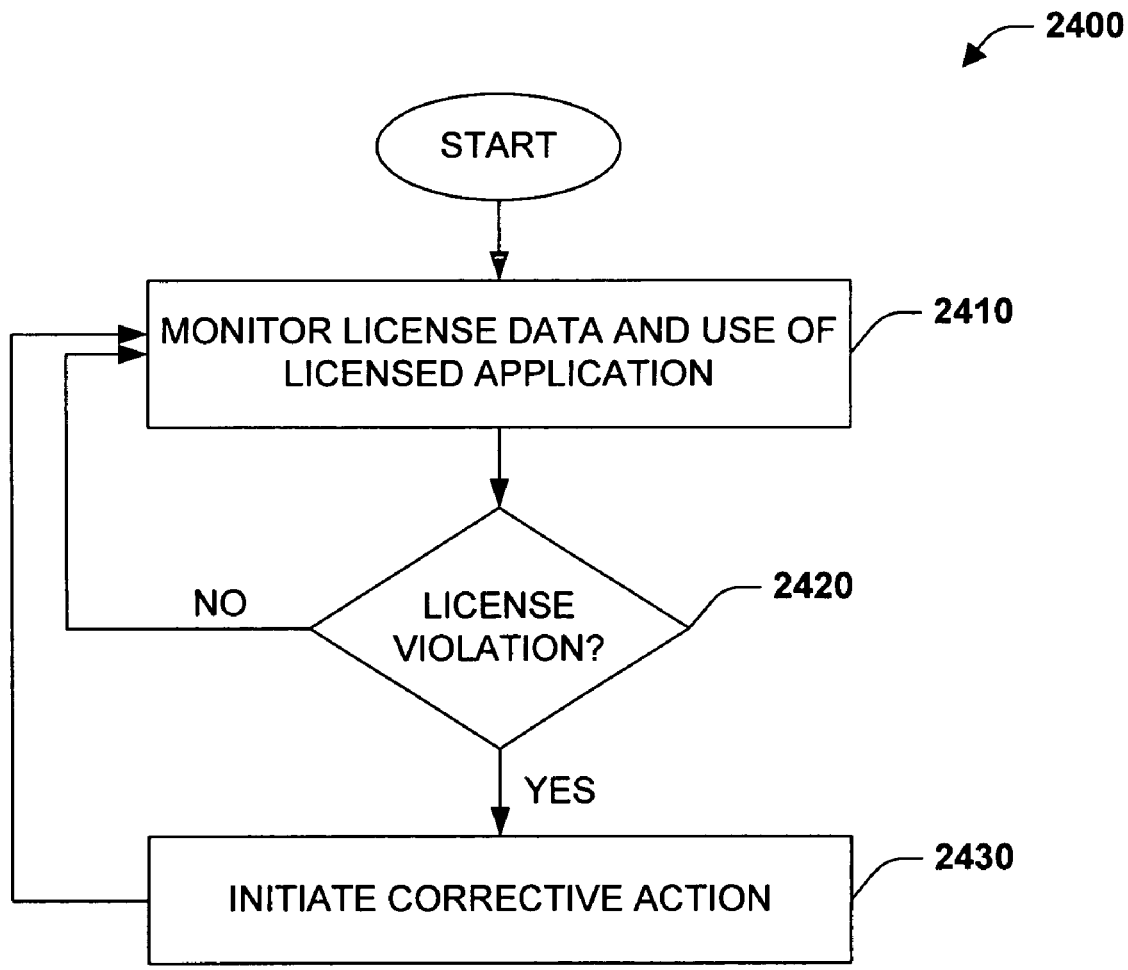
FIG. 24 is a flow chart diagram illustrating a method of enforcing license agreements in accordance with an aspect of the present invention.

Turning to FIG. 24, a methodology 2400 for enforcing licensing agreements is depicted in accordance with an aspect of the present invention. At 2410, license data and use of a licensed application is monitored. For instance, the number of licenses allocated for a particular applications and the number of users logging onto a system can be monitored. Additionally, computer hardware and/or system configuration can be monitored. At 2420, a determination is made as to whether there has been a license violation by comparing license data with current use of a licensed application associated with the license data. Violations occur if a user utilizes a system or application in a manner contrary to a licensing agreement. For instance, a violation can occur when the number of users logged-on to a system or application is greater than the number of licenses for the application. Additionally, a violation can occur if a server application is being run in a workgroup environment in violation of a licensing agreement stating the application would not be run in such an environment. If a violation has not been detected, then the license data and use of the application continue to be monitored at 2410. However, if a license violation is detected then corrective action is initiated at 2430. Corrective action can correspond to warning the user of the violation and/or shutting down the application or denying one or more users access thereto. Following initiation of corrective action at 2430 the method proceeds to monitor the license data and use of licensed applications at 2410.

Figure 25:
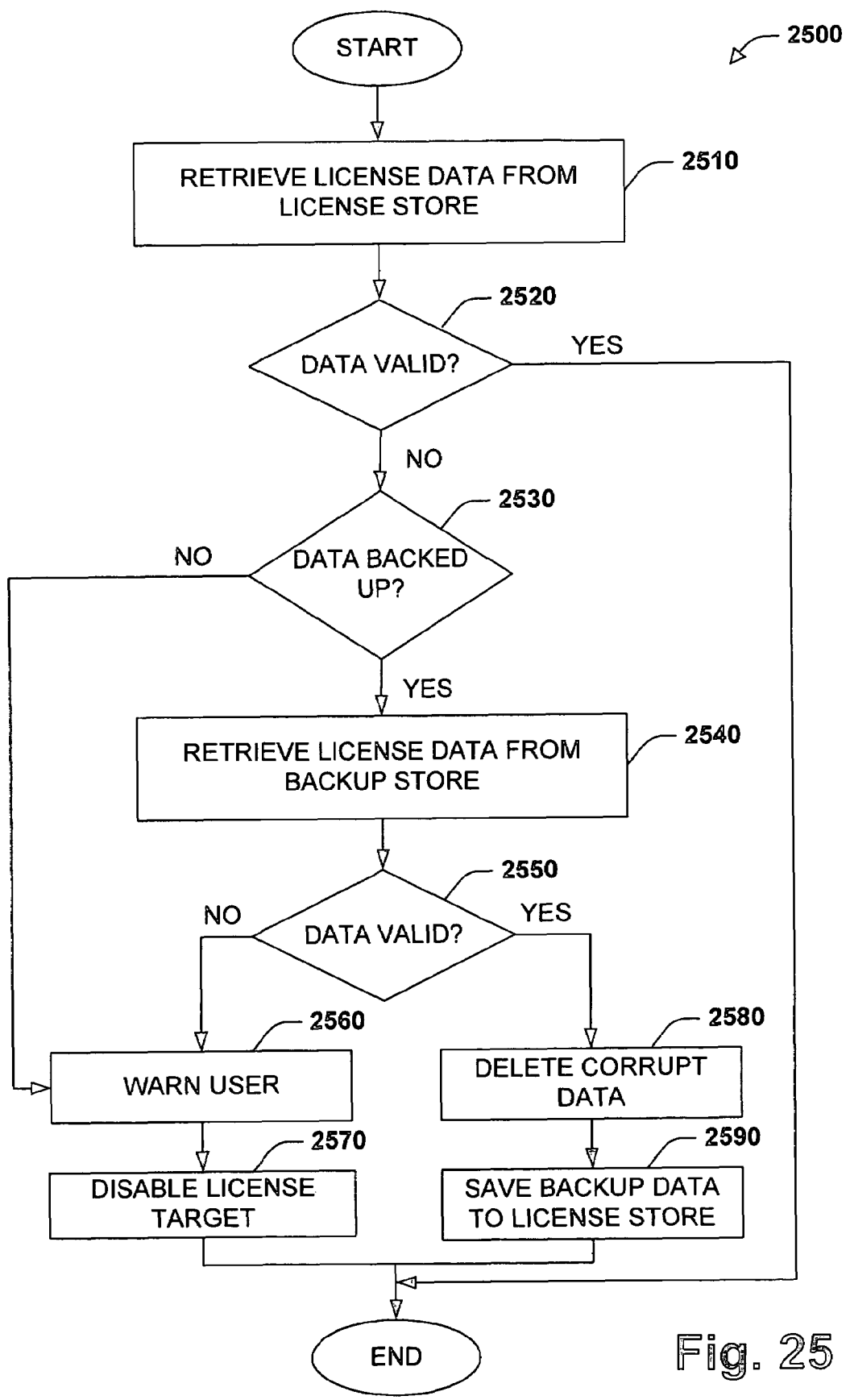
FIG. 25 is a flow chart diagram depicting a method of validating license data in a license store in accordance with an aspect of the subject invention.

FIG. 25 is a flow chart diagram of a method 2500 of validating license data in a store. At 2510, license data is retrieve from a license store. A determination is then made as to whether the license data is valid or not, at 2520. Data validity can be determined using a variety of methods known in the art such as using parity bits and the like. If the data is determined valid at 2520 the process is terminated. If the license data is not valid then a determination is made as to whether there is a backup of the license data at 2530. If there is no backup, then the user is warned of the corrupted license data at 2560, and the system is shut down at 2570. If there is a backup, the license data is retrieve from the backup store at 2540. Subsequently, a determination is made at 2550 as to whether the data in the backup store is valid. If the data is invalid or corrupt then the user can be warned at 2560 and a license target (e.g., system, application, service . . . ) can be disabled at 2570. If the data in the backup store is valid, then the data in the license store is deleted or otherwise removed at 2580, the backup data is stored to the license store at 2590 and the process is terminated. It should be noted that while this method or process can be run separating from method 2400 described above it can also be executed concurrently with method 2400 in accordance with an aspect of the invention to provide additional security data store while monitoring and enforcing licensing agreements.

Figure 26:
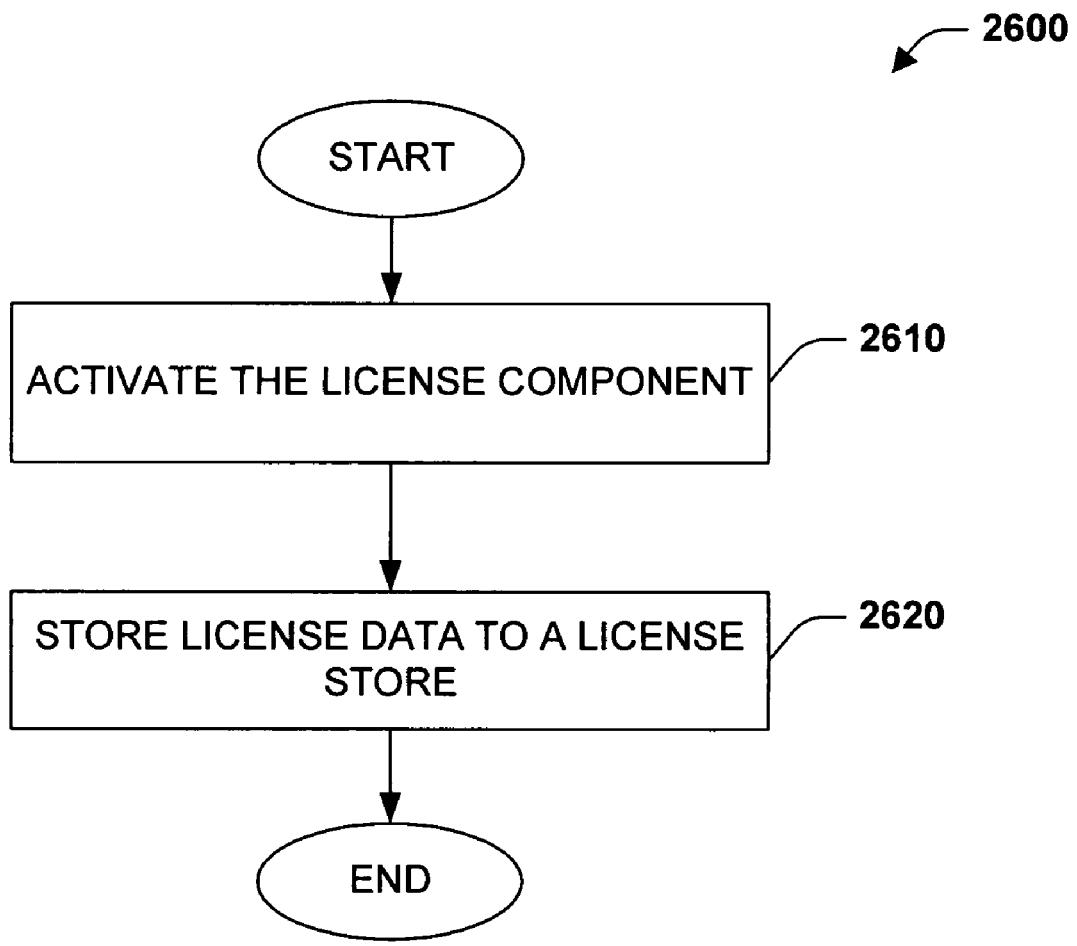
FIG. 26 is a flow chart diagram illustrating a method of adding licenses to a computer system in accordance with an aspect of the subject invention.

FIG. 26 illustrates a flow chart diagram of a methodology 2600 for adding licenses to a computer system. At 2610, a license component is activated. Subsequently, the license data including a value indicative of the number of licenses to be added is stored to a license store during installation of the license component on a computer. If the license store does not exist then a license store will be generated during installation of the license component.

Figure 27:
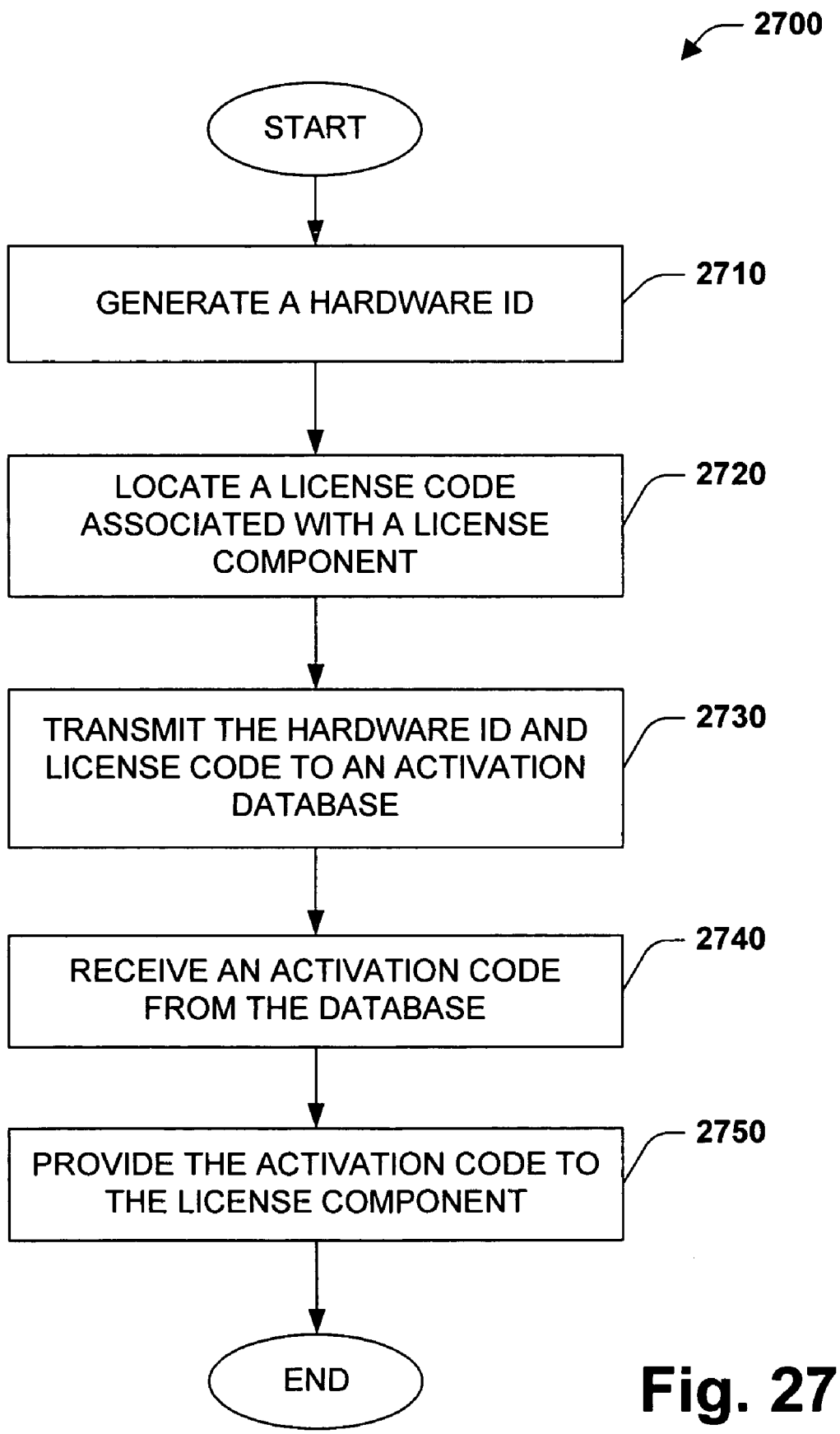
FIG. 27 is a flow chart diagram illustrating a methodology for activating a license component in accordance with an aspect of the present invention.

FIG. 27 is a flow chart diagram of a method 2700 for activating a license component. At 2710, a hardware ID is generated. The hardware ID binds a license component to a particular computing machine. The hardware ID is a code representative of various hardware components including but not limited to the central processor model, amount of RAM, hard drive volume serial number, network adapter address, and display adapter model. At 2720, the license code associated with a license component is located. For example, the license code can be printed on the packaging of a computer readable medium storing data thereon representing the license component or sent to a user via email. The hardware ID and license code are then transmitted to an activation database using the Internet, for instance, at 2730. Thereafter, an activation code is received from the activation database at 2740 and provided to the license component at 2750 completing the activation process.

Figure 28:
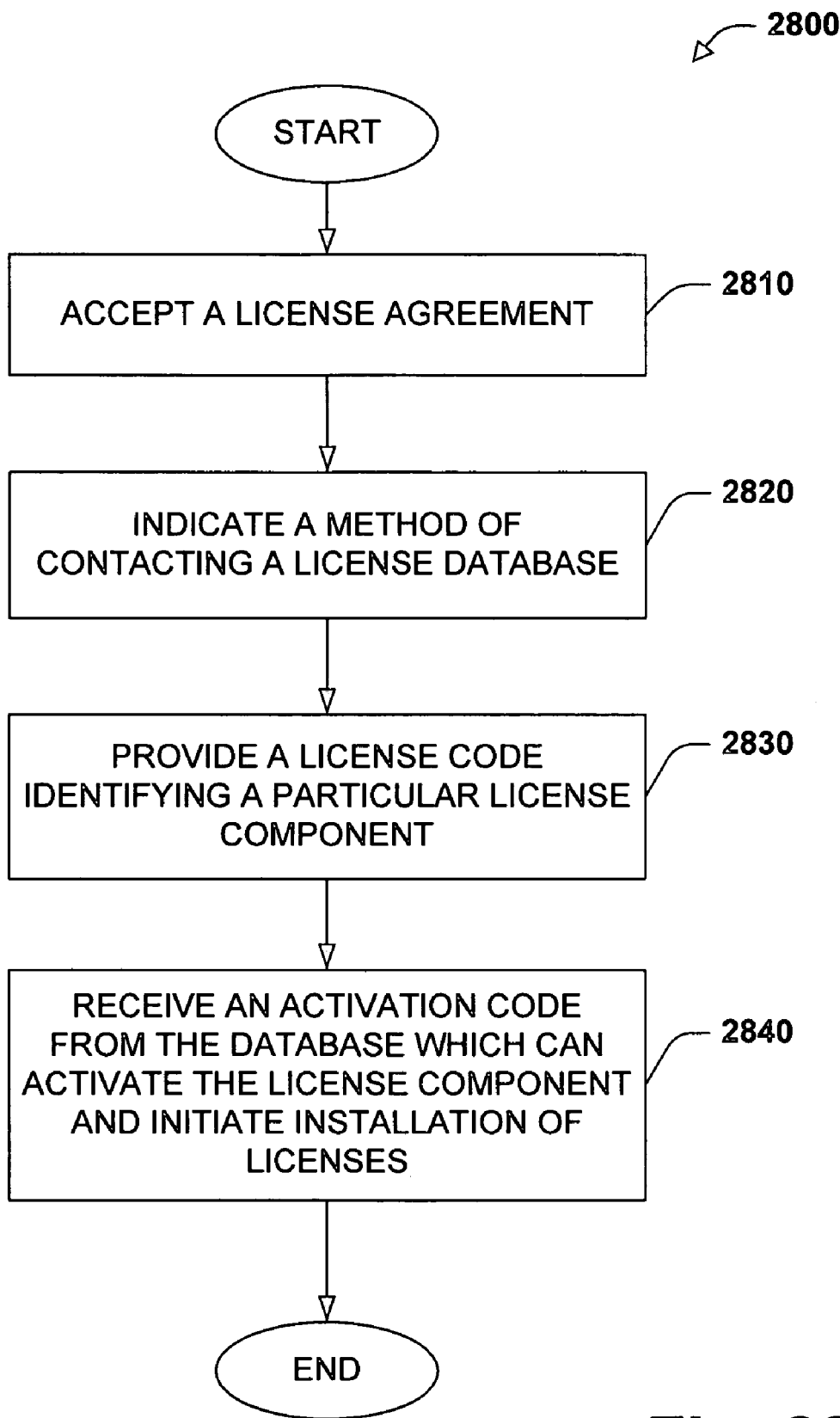
FIG. 28 is a flow chart diagram depicting a methodology for interaction with a wizard to add or transfer license components in accordance with an aspect of the present invention.

FIG. 28 illustrates a method 2800 of interacting with a wizard to add or transfer licenses to a computer system. At 2810, a user indicates acceptance of a license agreement. Acceptance can be specified after viewing the displayed license agreement by selecting a button (e.g., click on a radio button) that indicates acceptance of the agreement. At 2820, a user can indicate a method that he desires to utilize to contact a license database using an interface object such as a radio button. A user can contact a licensing database in a plurality of different manners including but not limited to over the Internet, by phone, or by facsimile. At 2830, a user provides one or more license codes or license IDs identifying particular license components that they wish to install. According to one aspect of the subject invention this can be accomplished by typing the license code into one or more text boxes provided by the interactive wizard. At 2840, one or more license activation codes are received from the license database, which can be used to activate licenses. Upon activation license components can be installed onto a computer system. Part of the installation process includes installing or saving the number of digital licenses provided by a license component to a license store, which completes the addition of licenses to the computer system. It should be appreciated that many other useful actions can be supported by a license addition wizard. For example, the wizard can provide interface objects to receive billing information (e.g., credit card number, billing address) to facilitate purchasing and downloading of license components over the interface. Furthermore, the license addition wizard can provide a step-by-step interface to guide users in setting up automatic billing and downloading of licenses when needed by a system to remain compliant with the license agreement. As all uses cannot possibly be described herein it should be noted that other uses of the license addition wizard that are revealed to a person upon reviewing this specification are also to be considered within the scope of the present invention.

Figure 29:
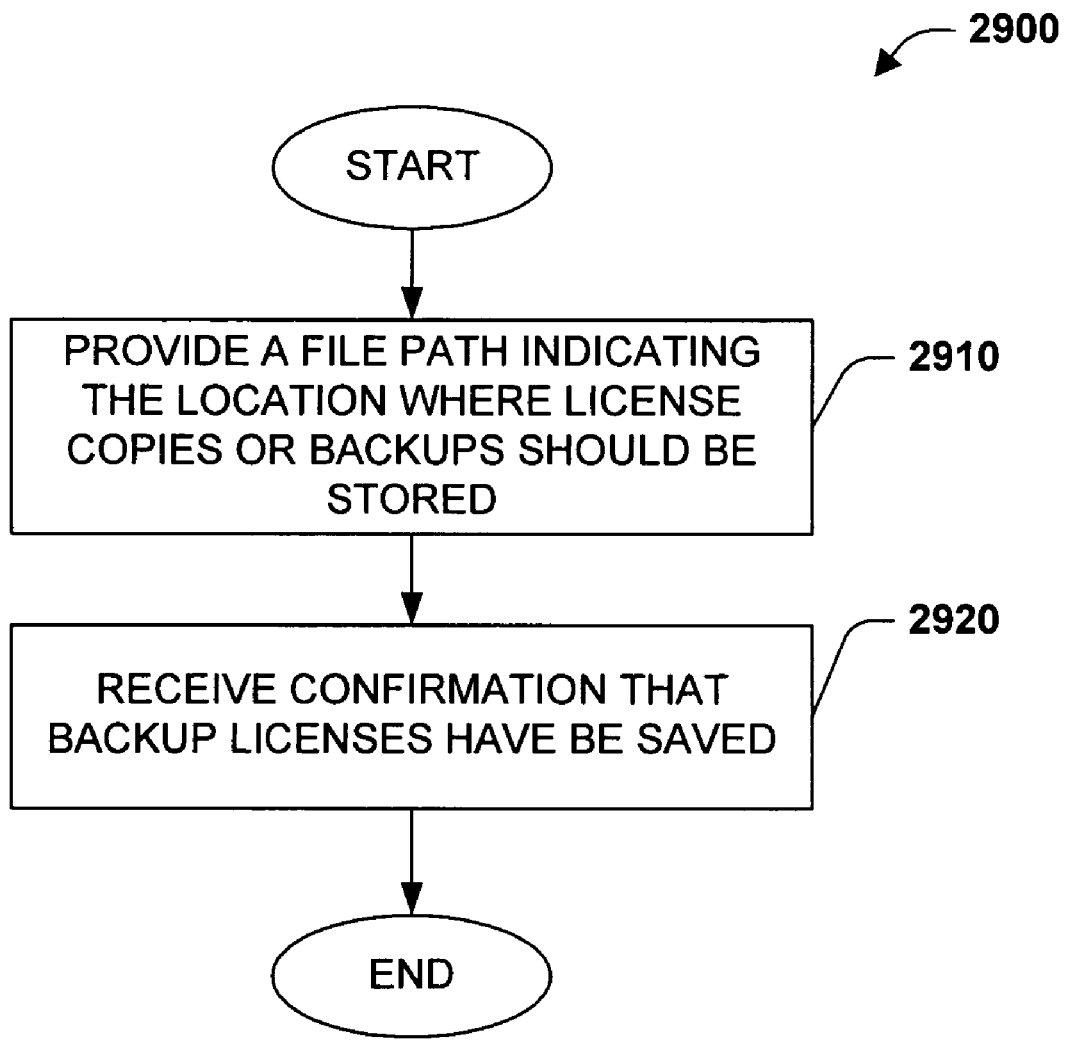
FIG. 29 is a flow chart diagram illustrating a method of backing up licenses in accordance with an aspect of the subject invention.

FIG. 29 is a flow chart illustrating a methodology 2900 of backing up licenses utilizing a wizard in accordance with an aspect of the present invention. At 2910, a file path is provided by a user indicating the location where they would like a backup copy stored. According to one aspect of the invention this location is an external portable medium including but not limited to a floppy disk, a compact disk, and a flash memory device (e.g., flash memory stick or card). Furthermore, the wizard can provide a mechanism to browse available storage mediums to facilitate locating a desired medium and file path. At 2920, a user received confirmation that licenses have been stored at the indicated location. Furthermore, the wizard can include a mechanism to facilitate printing, saving, or emailing confirmation information.

Figure 30:
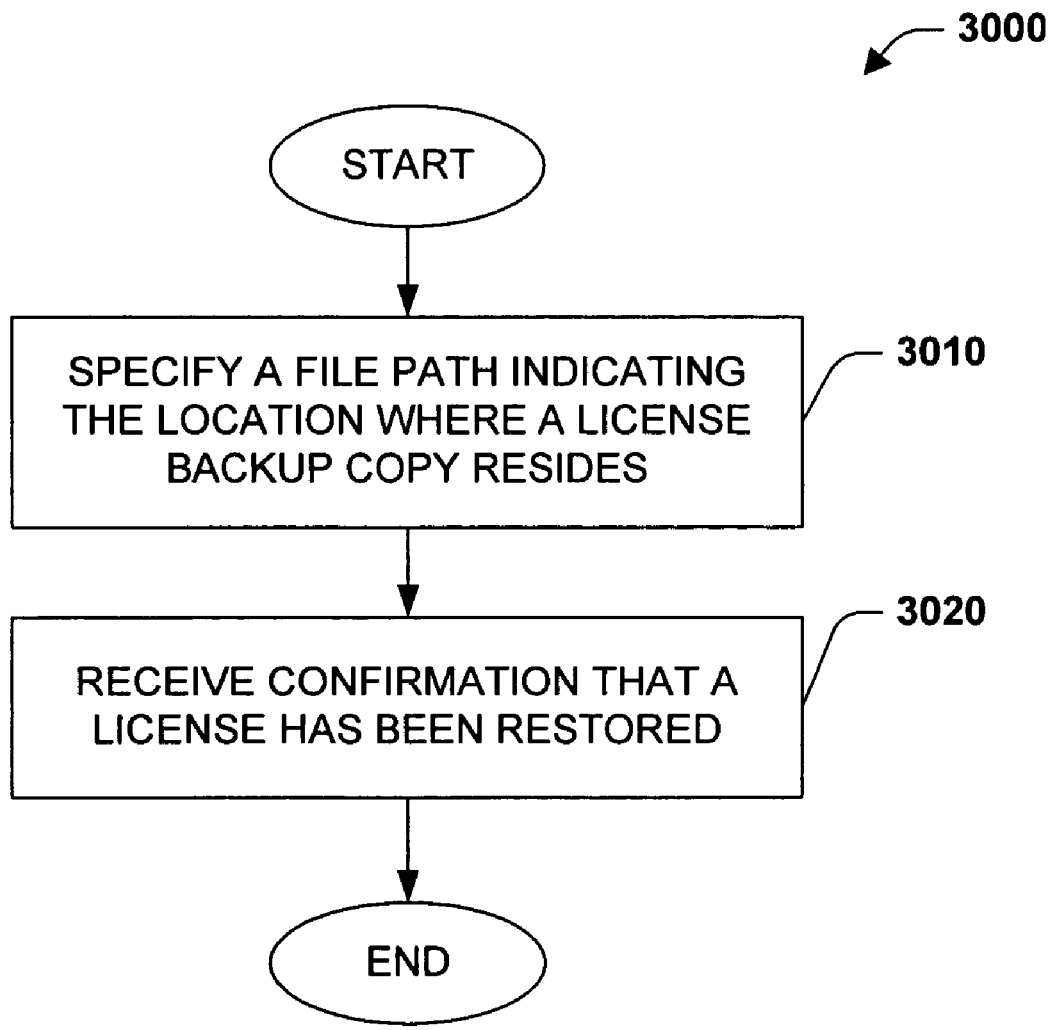
FIG. 30 is a flow chart diagram depicting a method of restoring licenses using an interactive wizard in accordance with an aspect of the subject invention.

FIG. 30 is a flow chart diagram depicting a method 3000 of restoring licenses using an interactive wizard. At 3010, a file path is specified indicating the location of the stored backup copy of a license to be restored. A confirmation is then provided by the wizard notifying a user that the licenses have been restored at 3020. According to an aspect of the present invention a mechanism can be provided by the wizard to facilitate specifying the location of the backed up license such as a browse button with a pop-up window graphically representing storage locations and file hierarchies. Furthermore, the wizard can provide a mechanism to facilitate printing, saving, or emailing information confirming that the license has been restored.

Figure 31:
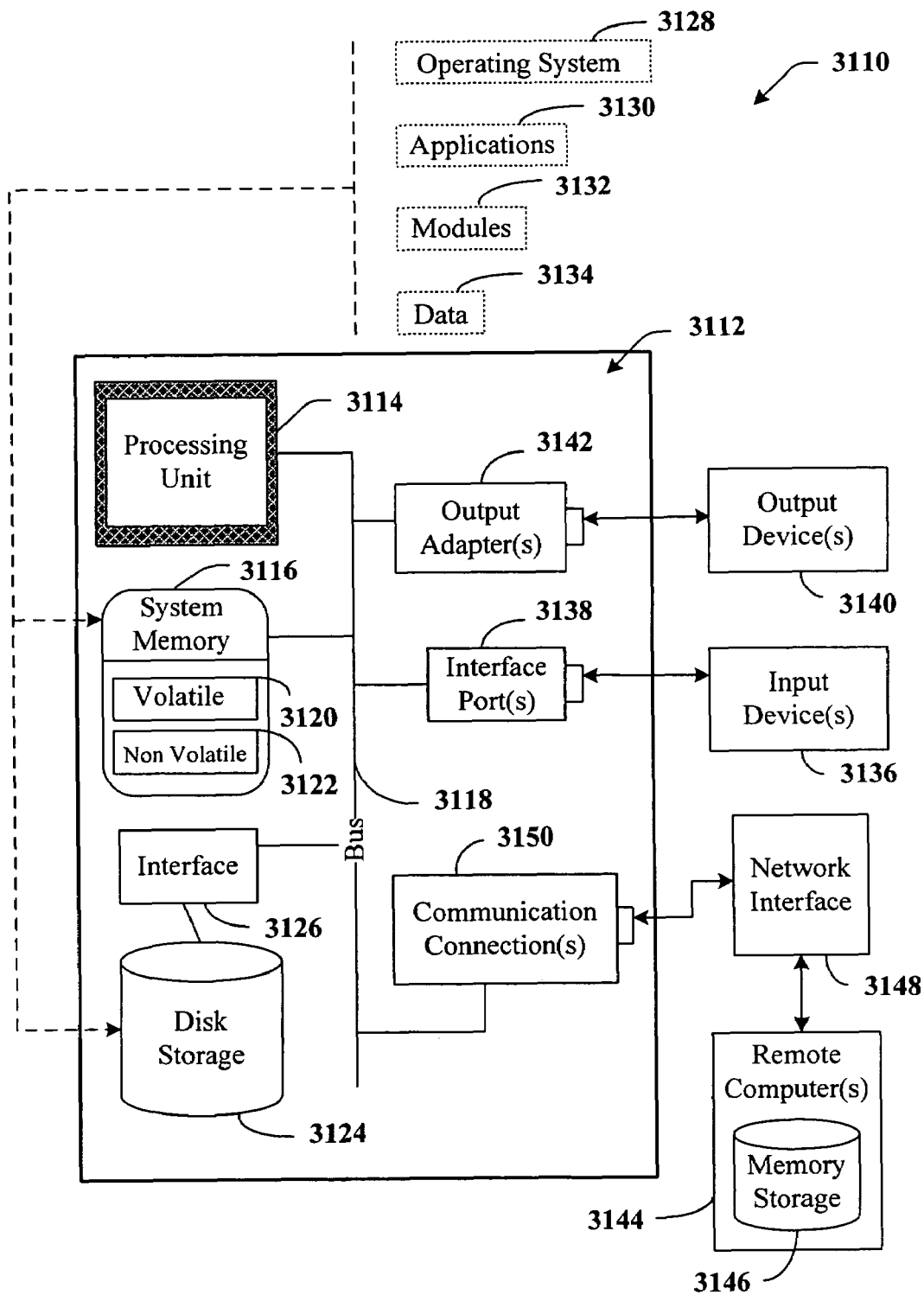
FIG. 31 is a schematic block diagram illustrating a suitable operating environment in accordance with an aspect of the present invention.
Figure 32:
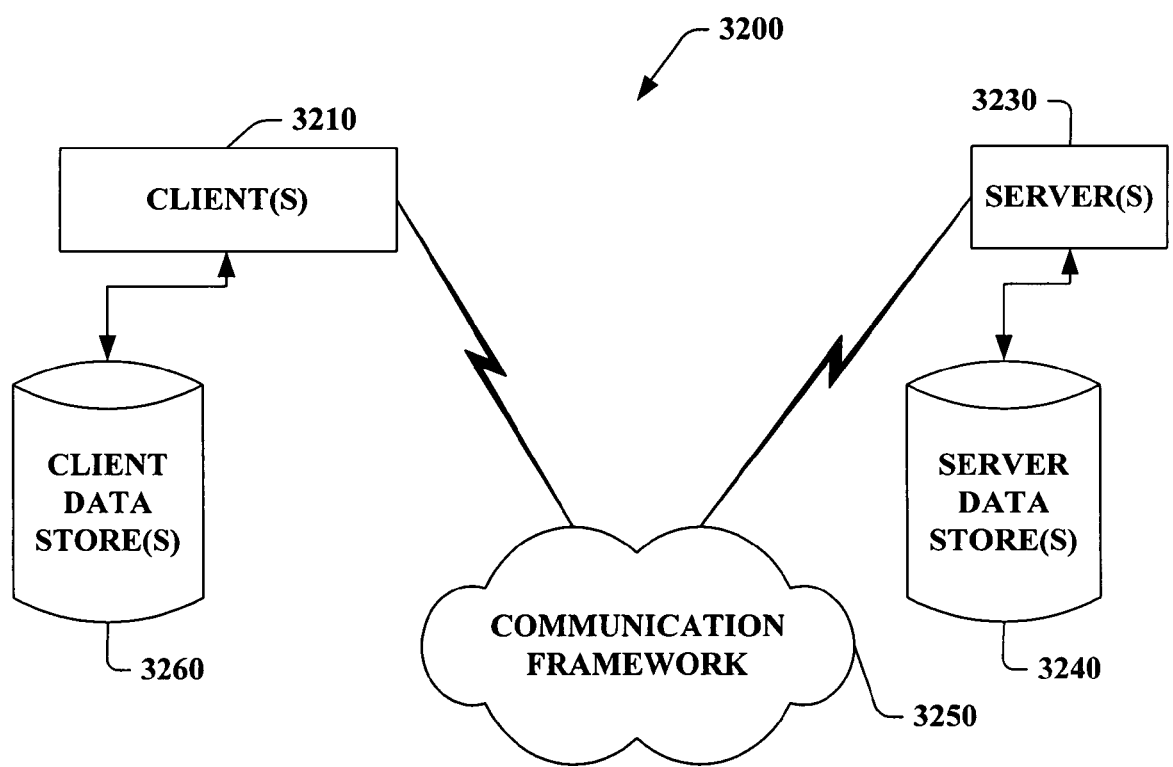
FIG. 32 is a schematic block diagram of a sample-computing environment with which the present invention can interact.

In order to provide a context for the various aspects of the invention, FIGS. 31 and 32 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 31, an exemplary environment 3110 for implementing various aspects of the invention includes a computer 3112. The computer 3112 includes a processing unit 3114, a system memory 3116, and a system bus 3118. The system bus 3118 couples system components including, but not limited to, the system memory 3116 to the processing unit 3114. The processing unit 3114 can be any of various available processors. Dual microprocessors and other multiprocessor architectures also can be employed as the processing unit 3114.

The system bus 3118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3116 includes volatile memory 3120 and nonvolatile memory 3122. The basic input/output system (BIOS), containing the basic routines to transfer information between elements within the computer 3112, such as during start-up, is stored in nonvolatile memory 3122. By way of illustration, and not limitation, nonvolatile memory 3122 can include read only memory (ROM), programmable ROM (PROM), electrically programmable ROM (EPROM), electrically erasable ROM (EEPROM), or flash memory. Volatile memory 3120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 3112 also includes removable/non-removable, volatile/non-volatile computer storage media. FIG. 31 illustrates, for example disk storage 3124. Disk storage 4124 includes, but is not limited to, devices like a magnetic disk drive, floppy disk drive, tape drive, Jaz drive, Zip drive, LS-100 drive, flash memory card, or memory stick. In addition, disk storage 3124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3124 to the system bus 3118, a removable or non-removable interface is typically used such as interface 3126.

It is to be appreciated that FIG. 31 describes software that acts as an intermediary between users and the basic computer resources described in suitable operating environment 3110. Such software includes an operating system 3128. Operating system 3128, which can be stored on disk storage 3124, acts to control and allocate resources of the computer system 3112. System applications 3130 take advantage of the management of resources by operating system 3128 through program modules 3132 and program data 3134 stored either in system memory 3116 or on disk storage 3124. It is to be appreciated that the present invention can be implemented with various operating systems or combinations of operating systems.

A user enters commands or information into the computer 3112 through input device(s) 3136. Input devices 3136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3114 through the system bus 3118 via interface port(s) 3138. Interface port(s) 3138 include, for example, a serial port, a parallel port, a game port, and a universal serial bus (USB). Output device(s) 3140 use some of the same type of ports as input device(s) 3136. Thus, for example, a USB port may be used to provide input to computer 3112 and to output information from computer 3112 to an output device 3140. Output adapter 3142 is provided to illustrate that there are some output devices 3140 like monitors, speakers, and printers, among other output devices 3140 that require special adapters. The output adapters 3142 include, by way of illustration and not limitation, video and sound cards that provide a means of connection between the output device 3140 and the system bus 3118. It should be noted that other devices and/or systems of devices provide both input and output capabilities such as remote computer(s) 3144.

Computer 3112 can operate in a networked environment using logical connections to one or more remote computers, such as remote computer(s) 3144. The remote computer(s) 3144 can be a personal computer, a server, a router, a network PC, a workstation, a microprocessor based appliance, a peer device or other common network node and the like, and typically includes many or all of the elements described relative to computer 3112. For purposes of brevity, only a memory storage device 3146 is illustrated with remote computer(s) 3144. Remote computer(s) 3144 is logically connected to computer 3112 through a network interface 3148 and then physically connected via communication connection 3150. Network interface 3148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3150 refers to the hardware/software employed to connect the network interface 3148 to the bus 3118. While communication connection 3150 is shown for illustrative clarity inside computer 3112, it can also be external to computer 3112. The hardware/software necessary for connection to the network interface 3148 includes, for exemplary purposes only, internal and external technologies such as, modems including regular telephone grade modems, cable modems and DSL modems, ISDN adapters, and Ethernet cards.

FIG. 32 is a schematic block diagram of a sample-computing environment 1000 with which the present invention can interact. The system 3200 includes one or more client(s) 3210. The client(s) 3210 can be hardware and/or software (e.g., threads, processes, computing devices). The system 3200 also includes one or more server(s) 3230. The server(s) 1030 can also be hardware and/or software (e.g., threads, processes, computing devices). The servers 3230 can house threads to perform transformations by employing the present invention, for example. One possible communication between a client 3210 and a server 3230 may be in the form of a data packet adapted to be transmitted between two or more computer processes. The system 1000 includes a communication framework 3250 that can be employed to facilitate communications between the client(s) 3210 and the server(s) 3230. The client(s) 3210 are operably connected to one or more client data store(s) 3260 that can be employed to store information local to the client(s) 3210. Similarly, the server(s) 3230 are operably connected to one or more server data store(s) 3240 that can be employed to store information local to the servers 3230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method implemented by a computing system that includes a processor and memory storing instructions which, when executed by the processor, implement the method for restricting concurrent execution at the computing system of a first application and at least a second application in accordance with a first license granted from a first licensor and corresponding to the first application, the method comprising acts of:

interrogating the computing system, and in response to the interrogating, receiving information identifying the computing system;

generating a hardware identification code based at least in part on the information identifying the computing system;

receiving a license code associated with the first license;

receiving an activation code that is based at least in part on the hardware identification code and the license code;

storing license data corresponding to the first license in a data store that is accessible to the computing system and in response to receiving the activation code, the stored license data including at least an issue date corresponding to a date on which the activation code was received, the hardware identification code, the license code, and a license agreement that provides contractual terms corresponding to at least use of the first application in relation to the second application;

monitoring the stored license data corresponding to the first license and use of the first application and the second application, said second application having a second license granted by a second licensor;

determining that the monitoring is not occurring or that the monitoring is occurring improperly, and restarting the monitoring;

determining, as a result of the monitoring, that the first application and the second application are being concurrently executed at the computing system and that the concurrent execution is a license violation according to the monitored license data corresponding to the first license; and initiating corrective action in response to the determination that there is a license violation.

2. The method of claim 1, further comprising an act of monitoring user logins.

3. The method of claim 1, further comprising an act of monitoring hardware associated with the execution of the first application.

4. The method of claim 1, wherein the initiated corrective action warns one or more users of the license violation.

5. The method of claim 1, wherein the initiated corrective action closes the first application.

6. A computer-implemented license enforcement system comprising a processor and one or more physical computer readable storage media operatively coupled to the processor, the computer readable storage media having stored thereon computer executable instructions that, when executed by the processor, implement the method of claim 1.

7. The method of claim 1, wherein determining that the concurrent execution is a license violation further comprises comparing a number of users licensed to utilize the first application to a number of users actually using the first application.

8. The method of claim 1, wherein determining that the concurrent execution is a license violation further comprises comparing a number of licenses to a number of devices, a violation occurring where the number of devices is greater than the number of licenses.

9. The method of claim 1, wherein determining that the concurrent execution is a license violation further comprises comparing a hardware configuration to an allowable hardware configuration specified by the first license.

10. The method of claim 1, further comprising modifying the initiated corrective action based at least in part on a further determined additional violation.

11. The method of claim 1, further comprising acts of:
combining at least a part of the hardware identification code and at least a part of the license code to generate an installation code; and
sending the installation code to a license database for generation of an activation code.

12. The method of claim 1, wherein the information identifying the computing system includes information identifying one or more of random access memory (RAM), a motherboard, the processor, a sound card, a hard drive, a network adapter, and a display adapter at the computing system.

13. The method of claim 1, wherein receiving the license code comprises receiving the license code from a bar code scanner.

14. The method of claim 1, further comprising an act of encrypting the stored license data.

15. The method of claim 1, further comprising acts of:
interrogating the computing system, and in response to the interrogating, receiving second information identifying the computing system;
generating a second hardware identification code based at least in part on the information identifying the computing system;
defining a tolerance identifying an acceptable difference between the second hardware identification code and the hardware identification code; and
determining that the second hardware identification code differs, beyond the tolerance, from the stored hardware identification code, and initiating corrective action in response to the determination that the second hardware identification code differs from the stored hardware identification code.

16. The method of claim 1, further comprising an act of determining that restarting the monitoring failed, and in response to determining that restarting the monitoring failed, closing the first application.

17. The method of claim 1, further comprising acts of:
copying the stored license data from the data store to a backup data store;
determining that the stored license data in the data store is invalid;
determining that the stored license data exists in the backup data store, and that the stored license data in the backup data store is valid;
deleting the stored license data in the data store; and
copying the stored license data from the backup data store to the data store.

18. The method of claim 1, wherein the stored license data further includes an expiration date that specifies a date when the first license becomes invalid, and a number of licenses that specifies a number of users allowed to use the first application.

19. The method of claim 1, further comprising receiving a bypass license code, and wherein the initiated corrective action is inaction when the bypass license code is active.

20. A computer program product comprising one or more physical computer readable storage media having stored thereon computer executable instructions that, when executed by a processor, perform the method of claim 1.

* * * * *